(12) United States Patent
Yoshida et al.

(10) Patent No.: US 7,295,994 B2
(45) Date of Patent: Nov. 13, 2007

(54) INFORMATION DISTRIBUTION SYSTEM, TERMINAL APPARATUS, INFORMATION CENTER, RECORDING MEDIUM, AND INFORMATION DISTRIBUTION METHOD

(75) Inventors: Tadao Yoshida, Kanagawa (JP); Chisato Kitsukawa, Tokyo (JP); Yoshihiko Hitotsui, Kanagawa (JP)

(73) Assignee: Sony Corporation (JP)

( * ) Notice: Subject to any disclaimer, the term of this patent is extended or adjusted under 35 U.S.C. 154(b) by 647 days.

(21) Appl. No.: 09/885,480

(22) Filed: Jun. 20, 2001

(65) Prior Publication Data

US 2002/0042777 A1  Apr. 11, 2002

(30) Foreign Application Priority Data

Jun. 23, 2000 (JP) ............................. 2000-194918

(51) Int. Cl.
*G06Q 30/00* (2006.01)

(52) U.S. Cl. ............................. 705/26; 705/27; 705/51; 705/58; 380/231; 380/233; 717/177; 717/178

(58) Field of Classification Search .................. 705/26, 705/27, 28, 29, 14, 24, 65, 51, 58, 70, 74; 712/36; 717/176, 177, 178; 380/231, 232
See application file for complete search history.

(56) References Cited

U.S. PATENT DOCUMENTS

| | | | | |
|---|---|---|---|---|
| 5,576,840 | A * | 11/1996 | Fukushima | .................. 386/46 |
| 6,018,720 | A * | 1/2000 | Fujimoto | ..................... 705/26 |
| 6,144,745 | A * | 11/2000 | Akiyama et al. | ........... 380/232 |
| 6,160,788 | A | 12/2000 | Kobayashi et al. | ...... 369/275.1 |
| 6,434,535 | B1 * | 8/2002 | Kupka et al. | ................. 705/24 |
| 6,539,468 | B1 * | 3/2003 | Inoue et al. | ................... 712/36 |
| 6,834,348 | B1 * | 12/2004 | Tagawa et al. | ............. 713/193 |

FOREIGN PATENT DOCUMENTS

EP  0898278  2/1999

(Continued)

OTHER PUBLICATIONS

"Broadcast Technology Leaders Premier MP-3 Datacasting Technology for Revenue—Generating Services at NAB 2000", Business Wire, Apr. 10, 2000, p. 1.*

*Primary Examiner*—F. Zeender
*Assistant Examiner*—M. Thein
(74) *Attorney, Agent, or Firm*—Lerner, David, Littenberg, Krumholz & Mentlik, LLP

(57) ABSTRACT

When content data are distributed from an information center via a predetermined communication line to a terminal apparatus loaded with a recording medium recorded with its identifier and prepaid information, the information center manages the usable remaining amount of money in the recording medium loaded in the terminal apparatus and updates this usable remaining amount of money every time content data are distributed. Further, if the usable remaining amount of money is smaller than the price of the content data distributed from the information center, the information center instructs the terminal apparatus to load another recording medium having a usable remaining amount of money sufficient to cover the content data to be distributed. Still further, a remaining recordable capacity of a recording medium loaded in the terminal apparatus is transmitted to the information center, and the information center compares the remaining recordable capacity with the size of the data content to be distributed. If the remaining recordable capacity is smaller than the size of the content data, the information center instructs the terminal apparatus to load a new recording medium having a recordable capacity enough for the content data to be distributed.

3 Claims, 19 Drawing Sheets

DISTRIBUTION SYSTEM CONFIGURATION

FOREIGN PATENT DOCUMENTS

| | | |
|---|---|---|
| EP | 0915410 | 5/1999 |
| EP | 0921487 | 6/1999 |
| EP | 0942417 | 9/1999 |
| EP | 1006526 | 6/2000 |
| JP | 10187914 | 7/1998 |

* cited by examiner

FIG. 7

CUSTOMER DATABASE

|      | MEDIUM ID | MONEY REMAINDER | PURCHASE LOG |
|------|-----------|-----------------|--------------|
| (K1) | ID1       | 3,700 YEN       | · · · · · · · |
| (K2) | ID2       | 100 YEN         | · · · · · · · |
| (K3) | ID3       | 1,200 YEN       | · · · · · · · |
| (K4) | ID4       | 5,000 YEN       | · · · · · · · |
| (K5) | ID5       | 0 YEN           | · · · · · · · |
| ⋮    | ⋮         | ⋮               | ⋮            |

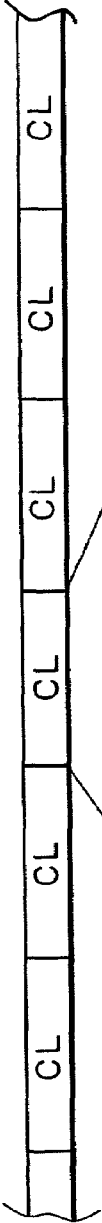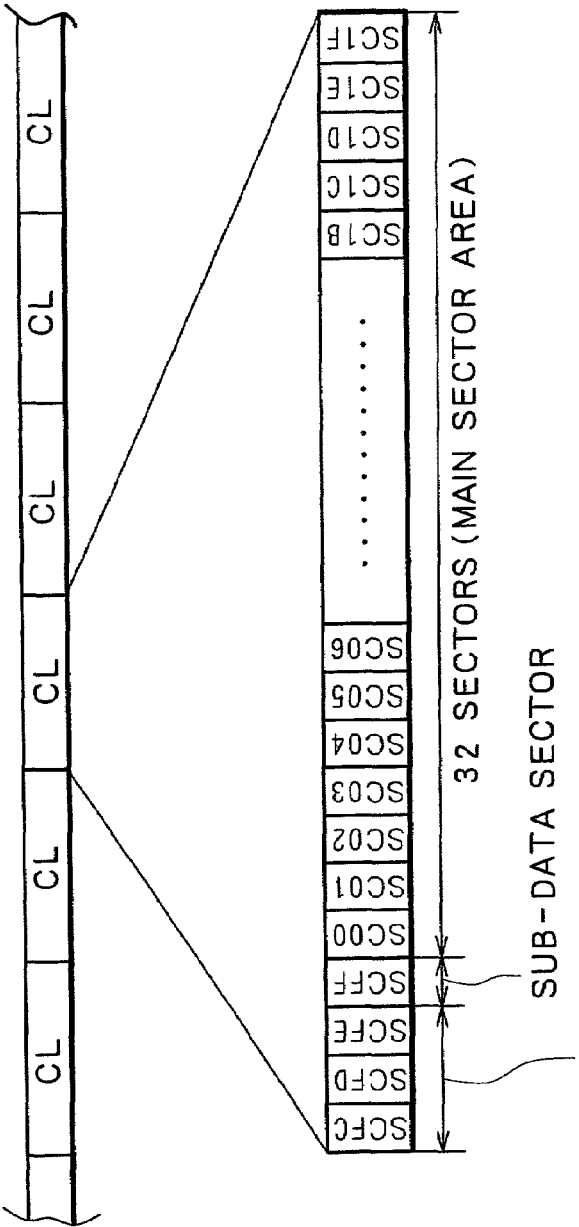
FIG. 9A
FIG. 9B

FIG.11

| | 16bits | | 16bits | | |
|---|---|---|---|---|---|
| | MSB  LSB | MSB  LSB | MSB  LSB | MSB  LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector | MODE | 3 |
| | | | | | 4 |
| | | | | | 5 |
| | " M " | " I " | " N " | " I " | 6 |
| | Disk type | Rec power | First TNO | Last TNO | 7 |
| | LEAD-OUT START ADDRESS (LOa) | | | Used Sectors | 8 |
| | POWER CALIBRATION AREA START ADDRESSa (PC) | | | | 9 |
| | U-TOC START ADDRESS (USTa) | | | | 10 |
| | RECORDABLE USER AREA START ADDRESS (RSTa) | | | | 11 |
| POINTER SECTION { | | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| PD { | ////// | ////// | ////// | ////// | 76 |
| | ////// | ////// | ////// | ////// | 77 |
| TABLE SECTION (255 PART TABLES) { (01h) | START ADDRESS | | | TRACK MODE | 78 |
| | END ADDRESS | | | | 79 |
| (02h) | START ADDRESS | | | TRACK MODE | 80 |
| | END ADDRESS | | | | 81 |
| (03h) | START ADDRESS | | | TRACK MODE | 82 |
| | END ADDRESS | | | | 83 |
| (FCh) | START ADDRESS | | | TRACK MODE | 580 |
| | END ADDRESS | | | | 581 |
| (FDh) | START ADDRESS | | | TRACK MODE | 582 |
| | END ADDRESS | | | | 583 |
| (FEh) | START ADDRESS | | | TRACK MODE | 584 |
| | END ADDRESS | | | | 585 |
| (FFh) | START ADDRESS | | | TRACK MODE | 586 |
| | END ADDRESS | | | | 587 |

P-TOC SECTOR 0

FIG.12

| | | 16bits | | 16bits | | |
|---|---|---|---|---|---|---|
| | MSB    LSB | MSB    LSB | MSB    LSB | MSB    LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | | | | | 4 |
| | | | | | 5 |
| | | | | | 6 |
| | Maker code | Model code | First TNO | Last TNO | 7 |
| | | | | Used Sectors | 8 |
| | | | | | 9 |
| | | | | Disc Serial No | 10 |
| POINTER SECTION { | Disc | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | | | | | 76 |
| | | | | | 77 |
| CONTROL TABLE SECTION (255 PART TABLES) { | (01h) ┌ START ADDRESS | | | TRACK MODE | 78 |
| |       └ END ADDRESS | | | LINK INFORMATION | 79 |
| | (02h) ┌ START ADDRESS | | | TRACK MODE | 80 |
| |       └ END ADDRESS | | | LINK INFORMATION | 81 |
| | (03h) ┌ START ADDRESS | | | TRACK MODE | 82 |
| |       └ END ADDRESS | | | LINK INFORMATION | 83 |
| | (FCh) ┌ START ADDRESS | | | TRACK MODE | 580 |
| |       └ END ADDRESS | | | LINK INFORMATION | 581 |
| | (FDh) ┌ START ADDRESS | | | TRACK MODE | 582 |
| |       └ END ADDRESS | | | LINK INFORMATION | 583 |
| | (FEh) ┌ START ADDRESS | | | TRACK MODE | 584 |
| |       └ END ADDRESS | | | LINK INFORMATION | 585 |
| | (FFh) ┌ START ADDRESS | | | TRACK MODE | 586 |
| |       └ END ADDRESS | | | LINK INFORMATION | 587 |

U-TOC SECTOR 0

FIG. 18

USER OWNED MEDIA

| MEDIUM ID | PREPAID MONEY REMAINDER | RECORDING REMAINDER |
|---|---|---|
| ID1 | X1(YEN) | A1(MINUTES) |
| ID2 | X2(YEN) | A2(MINUTES) |

PURCHASED CONTENT
B MINUTES, Y YEN

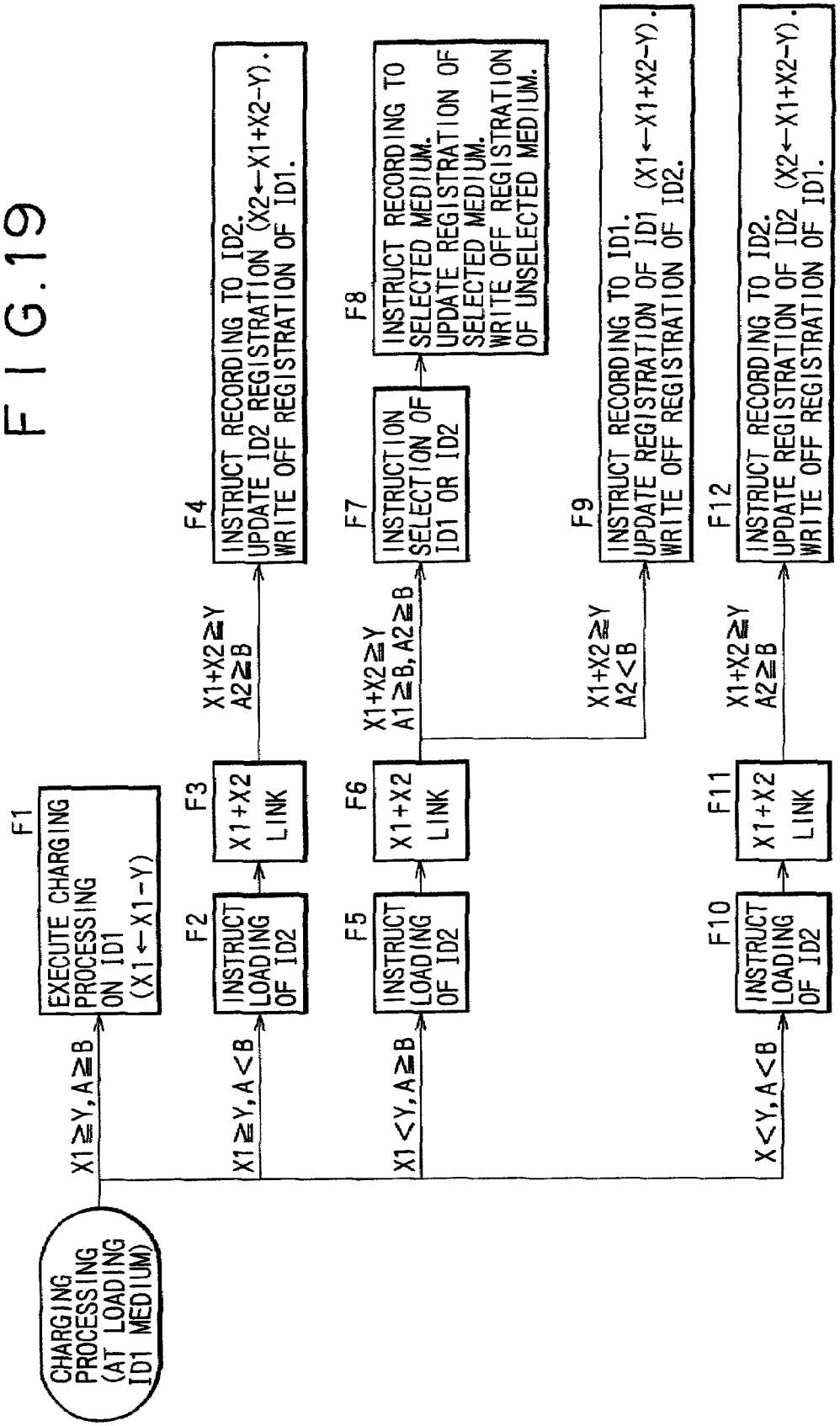

INFORMATION DISTRIBUTION SYSTEM, TERMINAL APPARATUS, INFORMATION CENTER, RECORDING MEDIUM, AND INFORMATION DISTRIBUTION METHOD

BACKGROUND OF THE INVENTION

The present invention relates generally to an information distribution system, a terminal apparatus, an information center, a recording medium, and an information distribution method for distributing and recording content such as music for example to a recording medium of a user.

Today, services for providing various kinds of content such as music, video, and text to users for pay are commercially available by means of communication networks such as the Internet.

In terms of music distribution for example, a user connects his terminal device such as a personal computer to a music download site for pay on the Internet. By looking at a distributed music purchase menu displayed on that site, the user selects desired music content and request the site for its downloading. The selected content is downloaded to such a recording medium of the user's terminal device as a hard disk for example.

For the payment for the downloaded content, it is often settled by inputting a user's credit card number for example.

Also available are systems by which users purchase music content from a dedicated terminal device installed at a music shop or a convenience store for example. In this case, each user goes to a music shop or a convenience store with a recording medium such as a Mini Disc (trademark) (a magneto-optical disc) on which music content can be recorded and loads it into the dedicated terminal device.

This dedicated terminal device, connected to a music content server, allows users to download music content. To be specific, a user selects desired music titles at the dedicated terminal device and the selected music titles are recorded on a Mini Disc for example loaded by the user.

The payment for the downloaded music content may be settled by inputting the user's credit card number as described above or by throwing in money as with an automatic vending machine for example.

However, the related-art settlement for the payment of downloaded content involves the following problems.

In the credit card settlement, the users having no credit card cannot obtain the content downloading service, thereby limiting this service only to those users who own credit cards.

This way of settlement also presents a credit card security problem.

The settlement by dedicated prepaid cards is also known. However, the acquisition of prepaid cards is troublesome for users and the use of prepaid cards requires some knowledge. Further, in applying prepaid cards to automatic vending machines, users must always carry a recording medium and a prepaid card, thereby it is not convenient. In addition, each automatic vending machine must have both a prepaid card insertion slot and a recording medium loading slot.

In the settlement by credit cards or prepaid cards, some knowledge is required about a card inputting procedure and about the system of payment settlement, which is unfriendly for users who are not well familiar with computer operations, thereby sometimes defeating their attempt to purchase content.

Although the above-mentioned dedicated terminal device allows the settlement by cash, users may feel inconvenience in not only loading a recording medium but also throwing in money every time content is downloaded.

SUMMARY OF THE INVENTION

It is therefore an object of the present invention to provide an information distribution system, a terminal apparatus, an information center, a recording medium, and an information distribution method which allow users to purchase distributed content with ease, convenience and security.

To achieve the above problems, according to a first aspect of the present invention, there is provided an information distribution system having a terminal apparatus in which a recording medium recording beforehand an identifier unique to the recording medium and prepaid information and is loadable and an information center which is connectable to the terminal apparatus and transmits content data thereto via a predetermined communication line, the terminal apparatus including first receiving means for receiving the content data transmitted from the information center, recording and reproducing means for recording the content data received by the first receiving means onto the recording medium loaded in the terminal apparatus and reproducing the identifier unique to the recording medium and the prepaid information, and first transmitting means for transmitting the reproduced identifier unique to the recording medium and the reproduced prepaid information to the information center, the information center including first storage means for storing a plurality of content data, second transmitting means for transmitting predetermined content data from the first storage means to the terminal apparatus, second receiving means for receiving the identifier unique to the recording medium and the prepaid information transmitted from the terminal apparatus, second storage means for storing a usable remaining amount of money in accordance with the identifier unique to the recording medium and the prepaid information received by the second receiving means, and charging processing means for updating, when the predetermined content data are transmitted from the first storage means to the terminal apparatus, the usable remaining amount of money stored in the second storage means for a charge of the predetermined content data transmitted from the first storage means to the terminal apparatus.

According to a second aspect, there is provided a terminal apparatus including loading means capable of loading a recording medium recording beforehand a identifier unique to the recording medium and prepaid information into the terminal apparatus, reproducing means for reproducing the identifier unique to the recording medium and the prepaid information from the recording medium loaded in the loading means, transmitting means for transmitting the identifier unique to the recording medium and the prepaid information reproduced by the reproducing means to an information center via a predetermined communication line, receiving means for receiving a result of a balance inquiry executed in the information center on the basis of the transmitted identifier unique to the recording medium and the transmitted prepaid information and content data transmitted from the information center, recording means for recording the content data received by the receiving means onto the loaded recording medium, and prompting means for prompting, if the balance inquiry received by the receiving indicates a shortage of amount of money for the received content data, the unloading of the currently loaded recording medium and the loading of another recording medium.

According to a third aspect, there is provided an information center, connected to a terminal apparatus via a predetermined communication line, for distributing content data, including first storage means for storing a plurality of content data, transmitting means for transmitting predetermined content data from the first storage means to the terminal apparatus, receiving means for receiving an identifier unique to a recording medium and prepaid information stored therein transmitted from the terminal apparatus, second storage means for storing a usable remaining amount of money in accordance with the identifier unique to the recording medium and the prepaid information received by the receiving means, and charging processing means for updating, when the predetermined content data are transmitted from the first storage means to the terminal apparatus, the usable remaining amount of money stored in the second storage means for a charge of the predetermined content data transmitted from the first storage means to the terminal apparatus.

According to a fourth aspect of the present invention, there is provided a recording medium including an unrewritable area in which an identifier unique to the recording medium and prepaid information are recorded beforehand, and a recording area in which content data are recorded, and a managing area in which recordable capacity of the recording area is managed.

According to a fifth aspect of the present invention, there is provided an information distribution method for distributing content data from an information center to a terminal apparatus in which a recording medium is loadable and recording the distributed content data thereto, the information center and the terminal apparatus being interconnected via a predetermined communication line, including the steps of receiving an identifier unique to the recording medium and prepaid information recorded on the recording medium beforehand, transmitted from the terminal apparatus, storing, in a memory, a usable remaining amount of money in accordance with the received identifier unique to the recording medium and the received prepaid information, comparing the usable remaining amount of money stored in the memory with a charge of content data to be distributed from the information center to the terminal apparatus, permitting, if the usable remaining amount of money stored in the memory is greater than the charge of the content data to be distributed from the information center to the terminal apparatus, the transmission of the content data from the information center to the terminal apparatus; and updating, by the charge of the content data, the usable remaining amount of money stored in a second memory when the content data are transmitted from the information center to the terminal apparatus.

BRIEF DESCRIPTION OF THE DRAWINGS

These and other objects of the invention will be seen by reference to the description, taken in connection with the accompanying drawing, in which:

FIG. 7 is a table which is managed by a customer database of the embodiment of FIG. 1;

FIG. 9A illustrates clusters constituting the unit of recording on a magneto-optical disc to which the invention is applied;

FIG. 9B illustrates the configuration of each cluster shown in FIG. 9A;

FIG. 11 illustrates the data structure of P-TOC sector controlled by the lead-in area of the magneto-optical disc of FIG. 10A;

FIG. 12 illustrates the data structure of U-TOC sector controlled by the control area of the magneto-optical disc of FIG. 10;

FIG. 18 is a table controlled by a customer database 70 practiced as a second embodiment of the invention; and FIG. 19 is a system diagram illustrating the processing to be executed in accordance with a recordable remainder and an available money remainder at the loading of a recording medium.

DETAILED DESCRIPTION OF PREFERRED EMBODIMENTS

Figure 1:
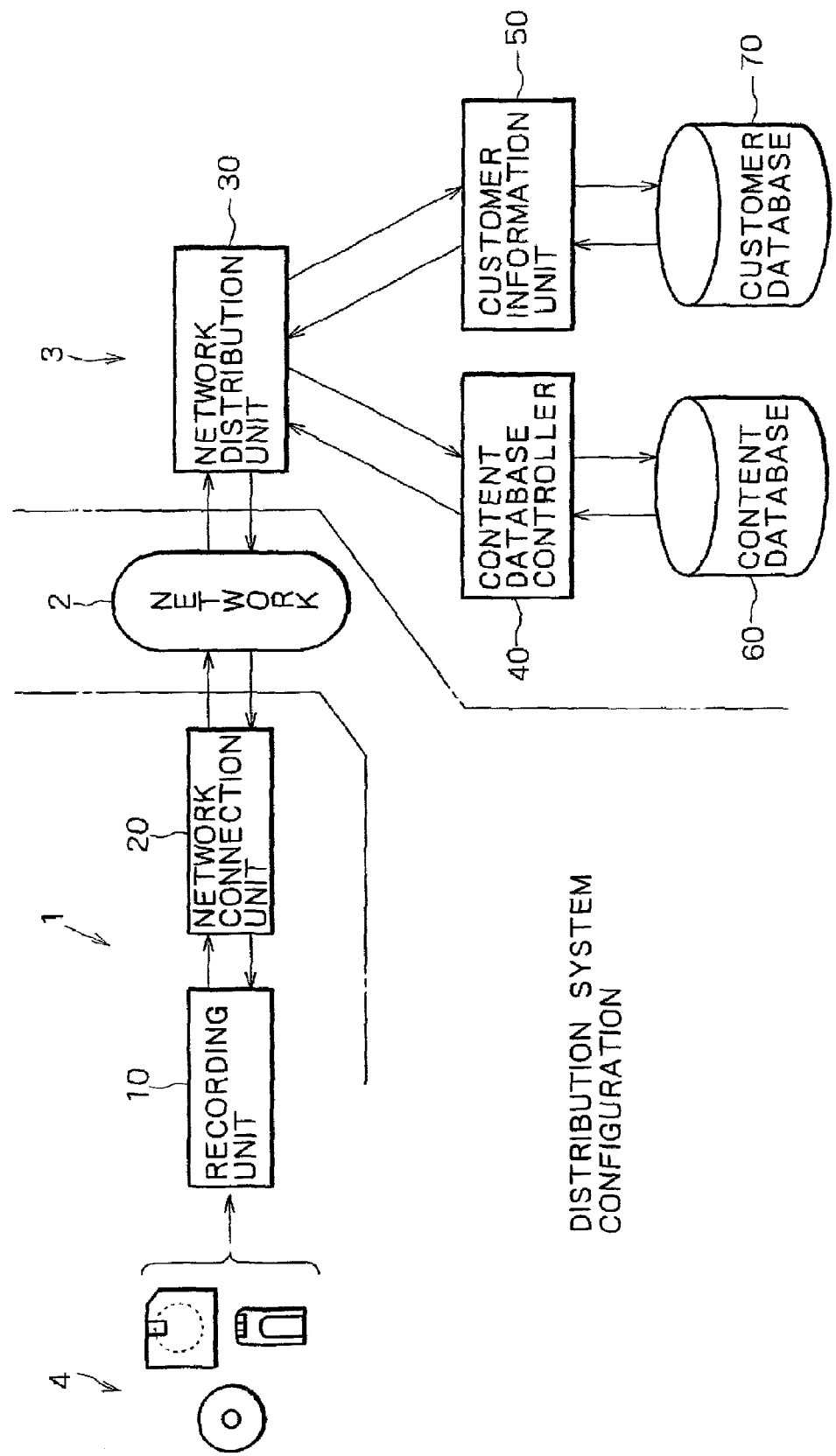
FIG. 1 is a schematic diagram illustrating an entire distribution system having a terminal device and a server practiced as one embodiment of the invention.

This invention will be described in further detail in the following order by way of example with reference to the accompanying drawings.

1. Distribution system
1-1 System configuration
1-2 Recording unit
1-3 Network connection unit
1-4 Network distribution unit
1-5 Content database controller
1-6 Customer information unit
2. Prepaid information
2-1 Prepaid information structure
2-2 Prepaid information recording forms to be used when the recording medium is a Mini Disc
3. Content distribution processing
3-1 Distribution processing procedure
3-2 Charging processing 1. Distribution System 1-1 System Configuration Now, referring to FIG. 1, there is shown an exemplary configuration of a content distribution system practiced as one embodiment of the invention. This content distribution system can provide for pay music content for example from a server 3 to a terminal 1. Obviously, this distribution system can also provide content such as video data and text data.

The terminal 1 may be an information device such as a personal computer installed in user's home or a dedicated leased line terminal installed at a music store for example. Also, the terminal 1 may be a wireless device such as a PDA (Personal Digital Assistant), a mobile telephone, or a on-vehicle communication device. Namely, the terminal 1 may be anything as long as it is communicable with the server 3 via a network 2. Further, the terminal 1 may be a household audio/video device having a communication capability.

The server 3, operated by an institution or an individual who performs content provision services, basically has a content holding capability for accumulating various kinds of content, a capability of providing, by communication with the terminal 1, the content held by the content holding capability, and an charging capability for performing charging management for users who accept the content provision by use of the terminal 1.

These capabilities may be totally operated by one organization or company for example or individually by different organizations, companies, and individuals for example in a cooperative manner. For example, each of these capabilities may be managed as different Web pages on the Internet which are linked each other for cooperative operation.

The network 2 may be a public phone line such as ISDN (Integrated Services Digital Network) line or a leased line. Alternatively, it may be a wireless network such as a wireless telephone line or a satellite communication line.

The terminal 1 has at least a recording unit 10 and a network connection unit 20 as shown in FIG. 1. The recording unit 10 records and reproduces information to and from a recording medium 4. The recording medium 4 is a portable recording medium on which prepaid information to be described later is written in a not rewritable manner. For example, the recording medium 4 may be a Mini Disc in which a magneto-optical disc is accommodated in a cartridge, a disc which is generally called as CD-R, CD-RW, DVD-RAM, DVD-RW, or DVD+RW, or a memory card based on flash memory. Obviously, the recording medium 4 may be other than those mentioned above. The network connection unit 20 communicates with the server 3 via the network 2 and executes the operation of the terminal 1 as a content distribution operation in the information distribution system according to the invention.

The terminal 1, if configured as a distribution dedicated terminal, may be constituted by the recording unit 10 and the network connection unit 20 in an integrated manner. Many personal computers and PDA devices have a drive for recording and reproducing information to and from recording medium 4. The terminal 2 may be constituted by such a drive and a communication capability. Obviously, the terminal 1 may be constituted by connecting a device having the capability of the recording unit 10 such as a Mini Disc recording and reproducing device to a personal computer for example having the capability of the network connection device 20.

The server 3 is constituted by a network distribution unit 30, a content database controller 40, a customer information unit 50, a content database 60, and a customer database 70. The network distribution unit 30 distributes content stored in the server 3 to the terminal 1. The content database controller 40 and the content database 60 implement the content holding capability. The customer information unit 50 and the customer database 70 implement the charging capability of performing charging management on the user of the terminal 1.

The content database 60, constituted by a recording medium such as a hard disk or an optical disk for example, stores many pieces of music content to be provided to users in the form of music library. The content database controller 40 controls the access to the music content for example stored in the content database 60. For example, the content database controller 40 reads the content requested by the network distribution unit 30 from the content database 60 and sends this content to the network distribution unit 30.

The customer database 70, constituted by a recording medium such as a hard disk or an optical disk, stores charging information in correspondence with the prepaid information recorded on each recording medium 4. The customer information unit 50 controls the registration and reading of the charging information for the customer database 70. For example, in response to a request from the network distribution unit 30, the customer information unit 50 newly registers charging information with the customer database 70 and reads a particular piece of charging information to provide it to the network distribution unit 30.

These components of the server 3 may be operated by one organization, company, or individual or by different organizations for example as described above. The content database 60 and the customer database 70 may be installed in different regions or countries. For example, the network distribution unit 30 may be operated by a distribution service company, the content database controller 40 and the content database 60 by a record company or a record label company for example, and the customer information unit 50 and the customer database 70 by an charging service company. There may be plural content database controllers 40 and content databases 60, in which the network distribution unit 30 distributes content from each of these content databases 60.

In the above-mentioned information distribution system according to the inventions, the user loads the recording medium 4 into the terminal 1. The terminal 1 then communicates with the server 3 to receive a list (or a menu) of content which can be provided to the user. The user selects a desired piece of content from the received list. Then, the selected piece of content is supplied from the server 3 to the terminal 1. The terminal 1 records the supplied content to the recording medium 4. Thus, the user can obtain the desired piece of content such as music for example.

In this example, the user is charged for the provided content on the basis of the prepaid information stored in the recording medium 4. The detail thereof will be described later. Each recording medium 4 carries a different medium ID and a prepaid amount of money as the prepaid information.

The terminal 1 sends this prepaid information to the server 3, upon which the network distribution unit 30 executes charging processing on the customer database 70 on the basis of the supplied prepaid information. In broad outline, the charging information corresponding to the prepaid information of each recording medium 4 is registered with the customer database 70, the amount of money equivalent to the cost of the provided content being subtracted from the prepaid amount of money in the charging information. Namely, the charging is executed by updating the charging information on the customer database 70. On the contrary, the prepaid information recorded on the recording medium 4 is not rewritten at all. More details will be described later.

1-2 Recording Unit

Figure 2:
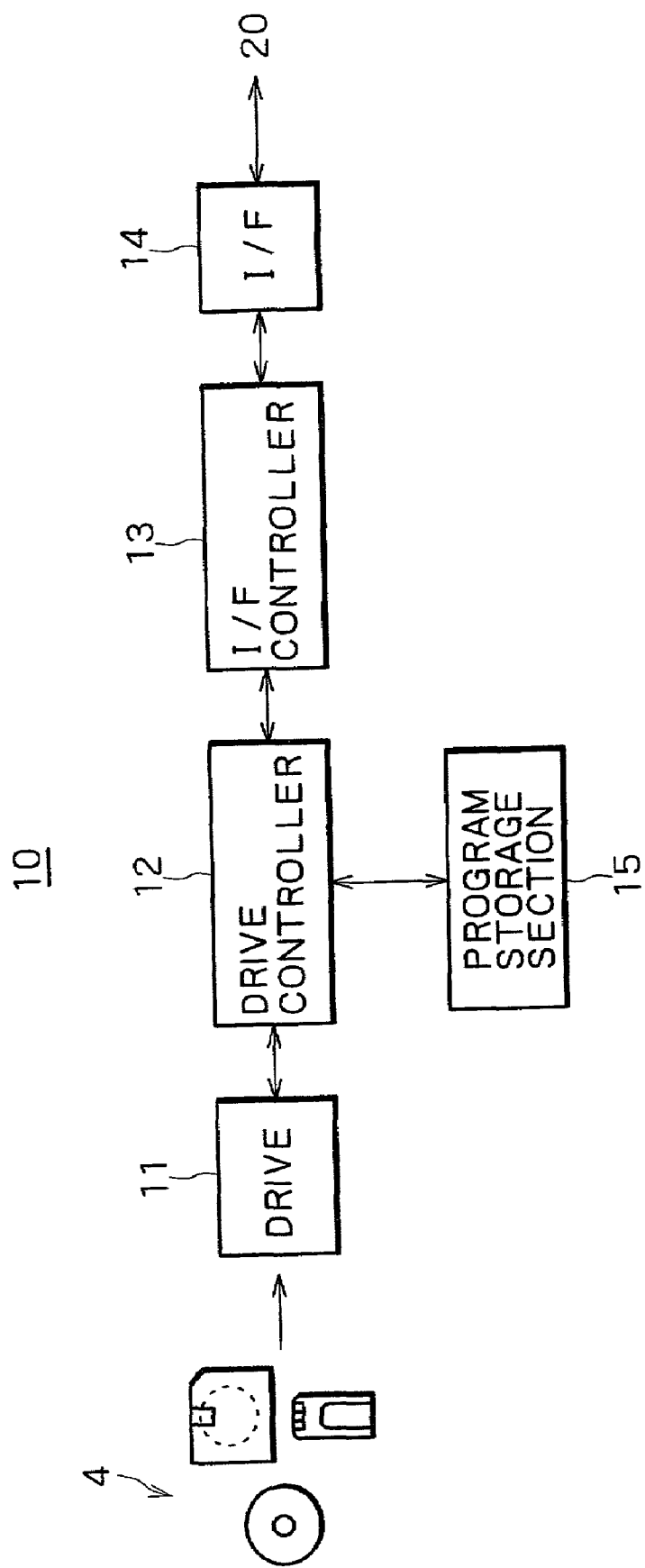
FIG. 2 is a block diagram illustrating a recording unit of the embodiment of FIG. 1.

Referring to FIG. 2, there is shown a block diagram of the recording unit 10. As shown, the recording unit 20 comprises a drive 11, a drive controller 12, an interface controller 13, an interface 14, and a program storage section 15.

The drive 11 records and reproduces information to and from the recording medium 4. If the recording medium 4 is a Mini Disc, the drive 11 comprises a recording/reproducing head, an encoder/decoder, a data buffer, and a servo, writing or reading information to or from the disc.

The drive 11 may have one or more slots in which the recording medium 4 is loaded. The arrangement of two or more slots facilitates the loading of two or more recording media 4 at a time for the charging processing to be described later.

The drive 11 may have both a drive construction for Mini Disc and a drive construction for memory card, thereby providing the compatibility with plural different types of recording media.

The drive controller 12 controls the entire recording unit 10 in the recording and reproducing operations of the drive 11 and the communication with the interface controller 13. Namely, in response to a request from the network connection unit 20, the drive controller 12 controls the other components of the recording unit 10 in writing or reading information to or from the recording medium 4, the reading or transfer of prepaid information, and the reading and transfer of the recordable capacity information of the recording medium 4.

These control operations of the drive controller 12 are executed as instructed by programs stored in the program storage section 15 constituted by a solid-state memory or a hard disk. The program storage section 15 stores not only the basic control programs for executing the operations of the recording unit 10 but also the application programs for reading the prepaid information and recordable capacity information from the recording medium 4 in this example. By controlling the drive 11 as instructed by the prepaid information processing application program, the drive controller 12 can read the prepaid information and recordable capacity information from the recording medium 4 and transfer these items of information to the network connection unit 20, thereby supplying the information necessary for the charging processing operation by the information distribution system according to the invention.

Depending on the recording form of prepaid information in the recording medium 4, the recording unit 10 may have a prepaid information recognition device as hardware for capturing prepaid information.

The interface 14 interfaces the recording unit 10 with the network connection unit 20, over which the interface controller 13 transfers various kinds of information.

1-3 Network Connection Unit

Figure 3:
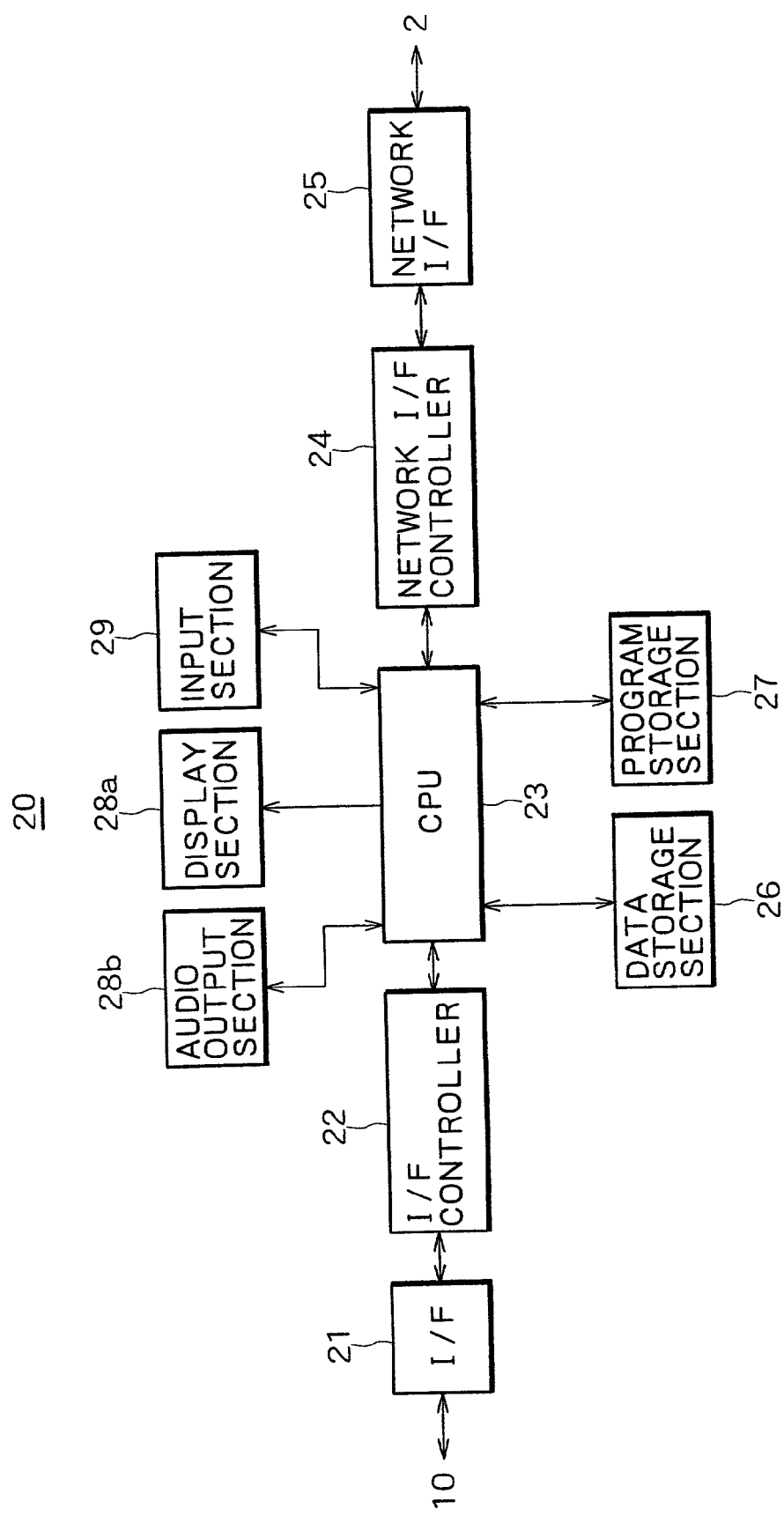
FIG. 3 is a block diagram illustrating a network connection unit of the embodiment of FIG. 1.

Referring to FIG. 3, there is shown a block diagram of the network connection unit 20. The network connection unit 20 comprises an interface 21, an interface controller 22, a CPU 23, a network interface controller 24, a network interface 25, a data storage section 26, a program storage section 27, a display section 28a, an audio output section 28b, and an input section 29.

The interface 21 interfaces the network connection unit 20 with the recording unit 10, over which various kinds of information are transferred under the control of the interface controller 22.

The CPU 23 controls the network connection unit 20 in its entirety. To be more specific, the CPU 23 controls the transfer/reception of various data with the server 3 for information distribution, the user interface processing, and the transfer/reception of various data with the recording unit 10, for example.

The control operations by the CPU 23 are executed as instructed by a program stored in the program storage section 27. The program storage section 27 is constituted by a solid-state memory or a hard disk for example. The program storage section 27 stores not only the basic control programs for executing the control operations of the network connection unit 20 but also the application programs for processing the prepaid information supplied from the recording medium 10. The CPU 23 controls the transmission of the prepaid information necessary for the charging processing in the present system to the server 3 as instructed by the prepaid information processing application program. The encryption and encoding of the prepaid information to be sent to the server are also controlled by the CPU 23 on the basis of the prepaid information processing application program.

The data storage section 26 is constituted by a solid-state memory or a hard disk as described above. The CPU 23 can also use the data storage section 26 for buffering the content downloaded from the server 3 or the prepaid information received from the recording unit 10 or as an extended work memory for the computational operations by the CPU 23.

The network interface 25 provides interface with the network 2 and is controlled by the network interface controller 24. The network interface 25 may be constituted by a modem for example or may be a wireless communication unit.

The display section 28a, the audio output section 28b, and the input section 29 provide a user interface.

The display section 28a displays the menu screens for distributed content, various operation screens, and a guide screens to the user.

The audio output section 28b comprises an audio decoder, an A/D converter, a audio processor, an amplifier, and a speaker for example, outputting audio signals. The information distribution system according to the invention allows the user to have a trial listening to music content before purchasing, for example. For trial listening, the CPU 23 supplies the trial listening content downloaded from the server 3 to the audio output section 28b for the user to have a trial listening.

The input section 29 is operated by the user. The input section 29 may be an operation key, an operation dial, or a pointing device such as a keyboard or a mouse, for example. Obviously, the input section 29 may be a touch panel which is integrated with the display section 28a.

1-4 Network Distribution Unit

Figure 4:
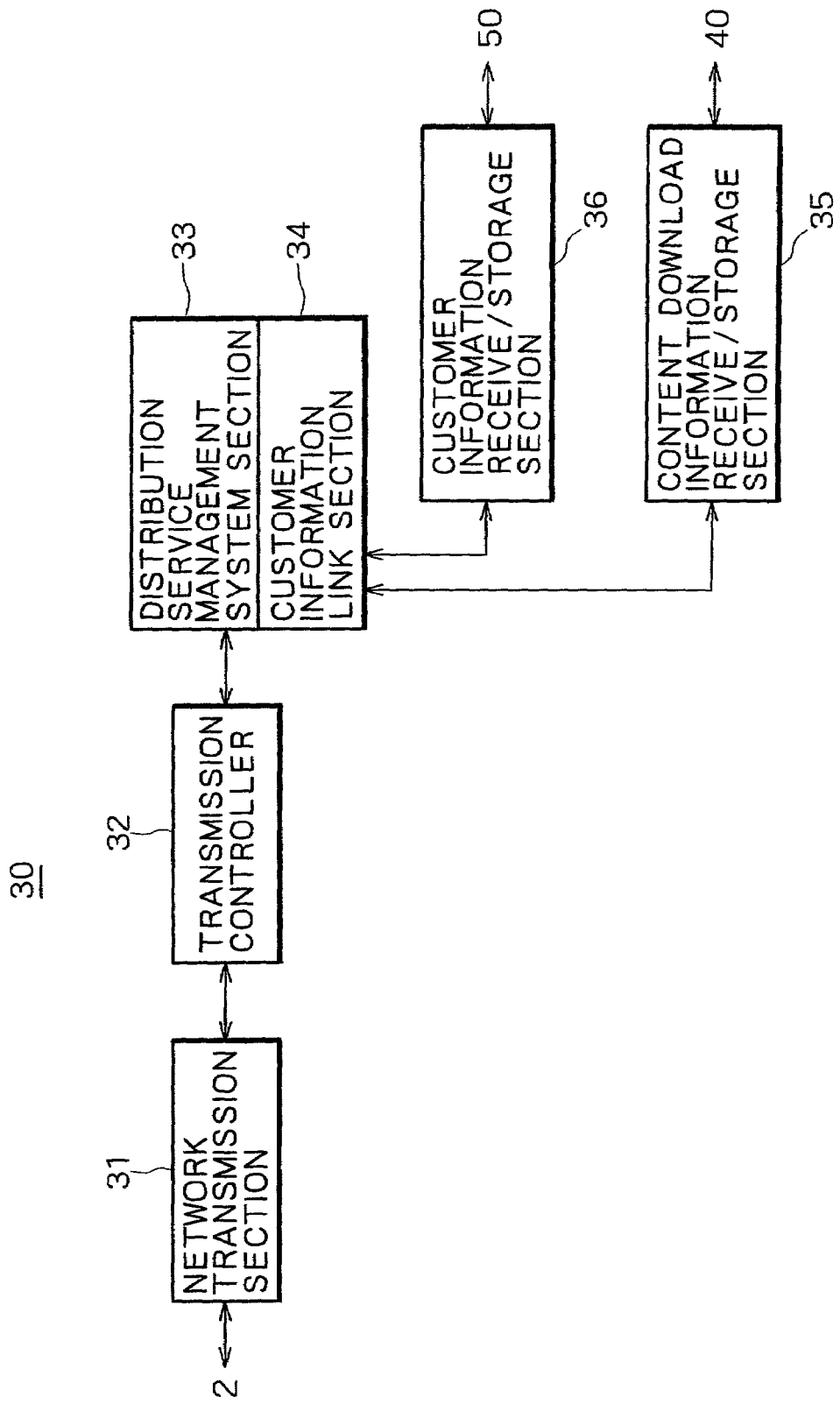
FIG. 4 is a block diagram illustrating a network distribution unit of the embodiment of FIG. 1.

Referring to FIG. 4, there is shown a block diagram of the network distribution unit 30. The network distribution unit 30 comprises a network transmission section 31, a transmission controller 32, a distribution service management system section 33, a customer information link section 34, a content download information reception/storage section 35, and a customer information reception/storage section 36.

The network transmission section 31, connected to the network 2, transmits information. The transmission controller 32 controls the transfer/reception operations to be executed by the network transmission section 31.

The distribution service management system section 33 controls the distribution operations as the server 3 and is constituted by a controller as the server main. To be more specific, the distribution service management system section 33 controls all distribution service processing including the processing of the prepaid information and purchase information supplied from the terminal 1 via the network transmission section 31, the processing for capturing and transmitting content in response to the prepaid information and purchase information, the charging processing, and the processing for communication and connection with the terminal 1.

The customer information link section 34 links the prepaid information and purchase information supplied from the terminal 1 to the charging information read from the customer database 70 and the content read from the content database 60 to execute necessary processing.

The content download information reception/storage section 35 receives and temporarily stores the information read from the content database 60 by the content database controller 40.

The customer information reception/storage section 36 receives and temporarily stores the information read from the customer database 70 by the customer information unit 50.

Namely, the customer information link section 34 links the prepaid information and purchase information supplied from the terminal 1 to the information stored in the customer information reception/storage section 36 and the content download information reception/storage section 35 to execute the processing necessary for content distribution.

1-5 Content Database Controller

Figure 5:
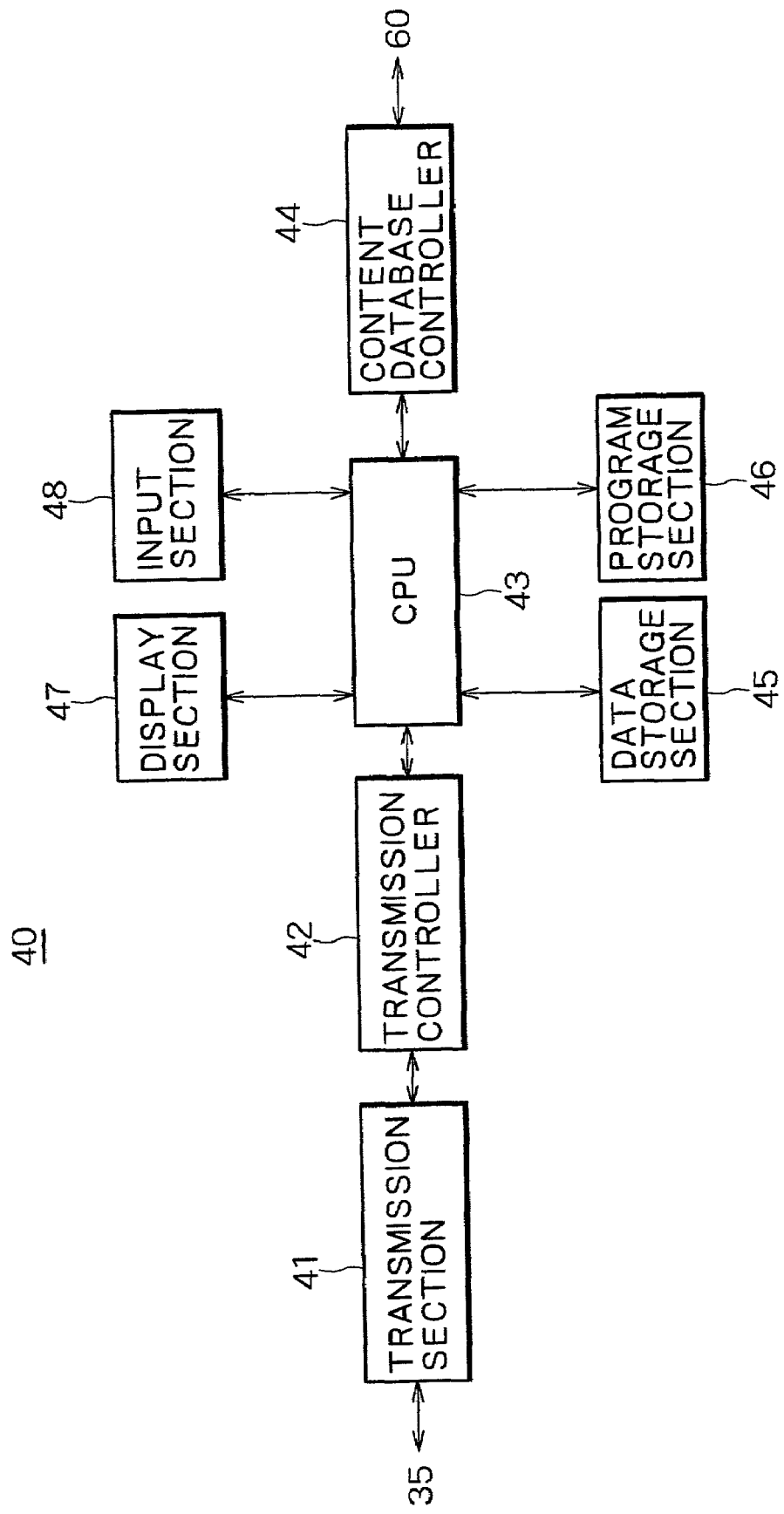
FIG. 5 is a block diagram illustrating a content database controller of the embodiment of FIG. 1.

Referring to FIG. 5, there is shown an exemplary configuration of the content database controller 40. The content database controller 40 comprises a transmission section 41, a transmission controller 42, a CPU 43, a content database controller 44, a data storage section 45, a program storage section 46, a display section 47, and an input section 48.

The transmission section 41, connected to the content download information reception/storage section 35 of the network distribution unit 30, transmits information. The transmission controller 42 controls the information transfer/reception operation to be executed by the transmission section 41.

The CPU 43 controls the content database controller 40 in its entirety. Namely, the CPU 43 controls the command and content transfer/reception operations with the network distribution unit 30 and the read/write operations on the content database 60.

These control operations by the CPU 43 are executed as instructed by a program stored in the program storage section 46. The program storage section 46 is constituted by a solid-state memory or a hard disk for example. The program storage section 46 stores the programs for accessing and managing the content database 60 and controlling the communication with the network distribution unit 30 and processing the data to be transmitted.

The data storage section 45 is also constituted by a solid-state memory or a hard disk for example. The CPU 43 can use the data storage section 45 to buffer the content read from the content database 60 or the content to be stored therein or as an extended work memory for computational operations by the CPU 43.

The content database controller 44 controls the content database 60 as instructed by the CPU 43, thereby executing access operations for writing, reading, and searching for content.

The display section 47 and the input section 48 provide an interface for the content database manager. The display section 47 displays images necessary for managing the content database 60 under the control of the CPU 43. The input section 48 is used to perform various input operations for managing the content database 60.

1-6 Customer Information Unit

Figure 6:
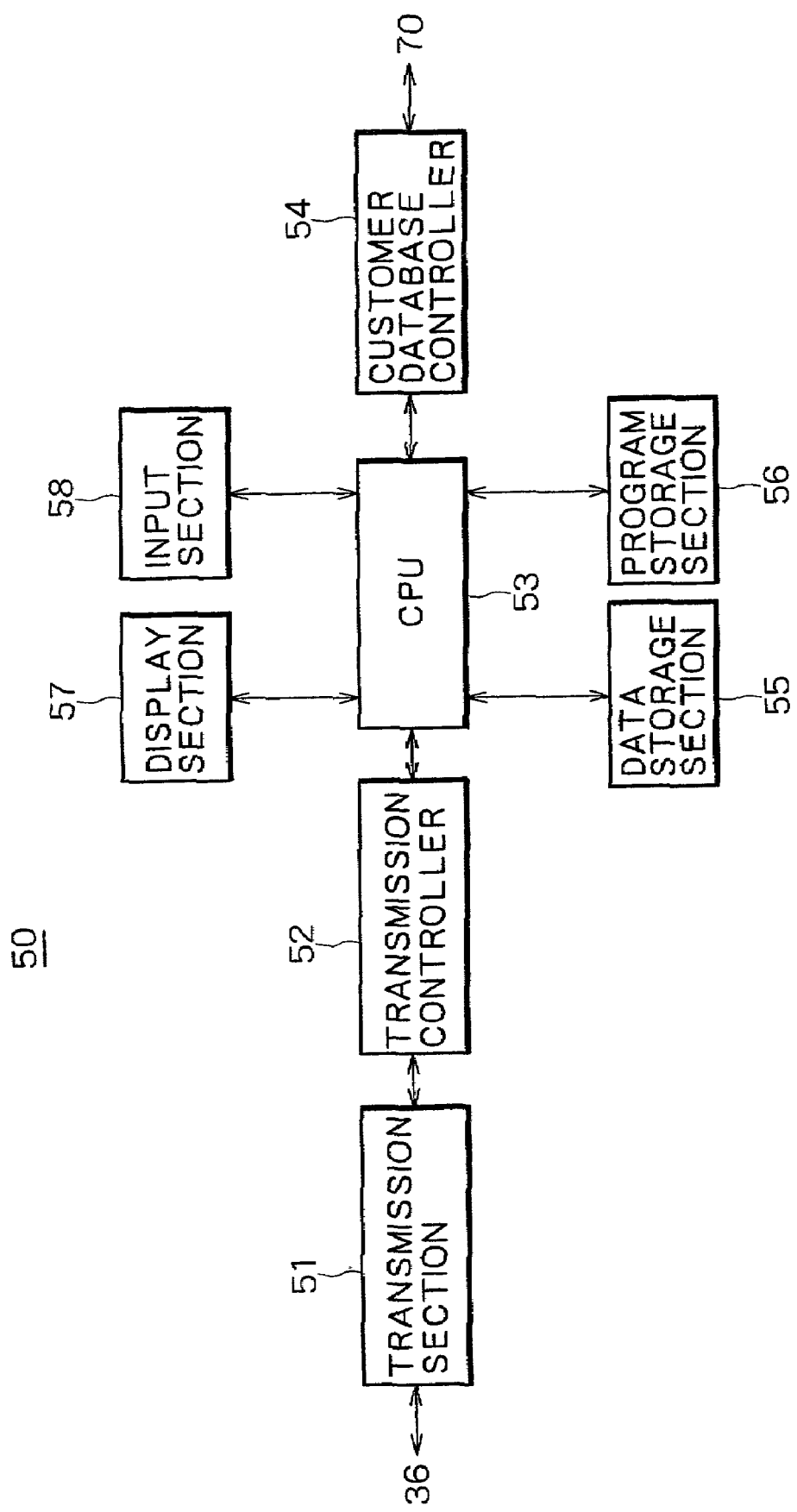
FIG. 6 is a block diagram illustrating a customer information unit of the embodiment of FIG. 1.
Figure 8:
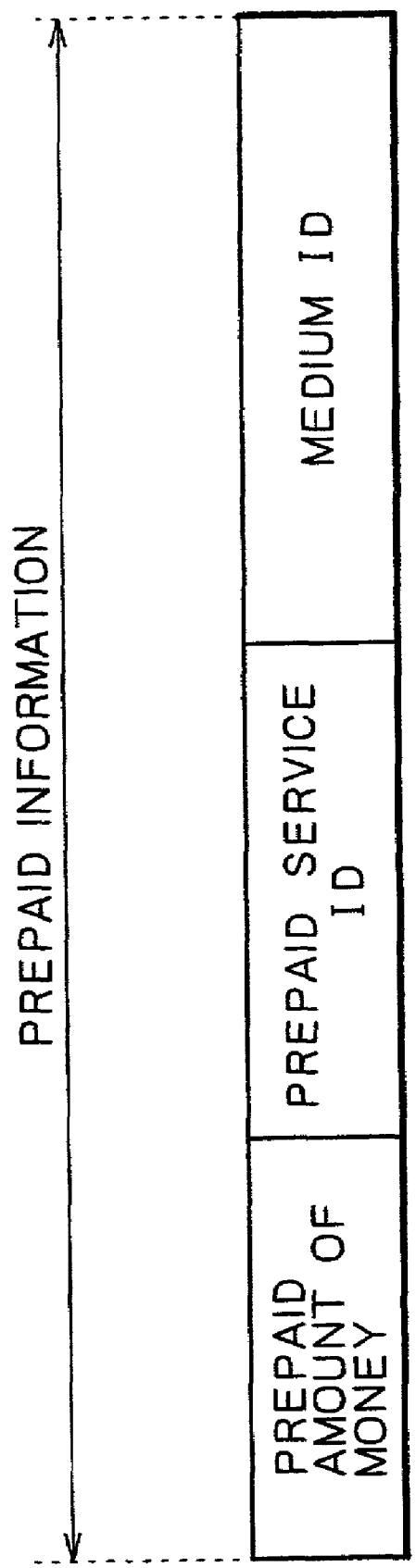
FIG. 8 illustrates a data structure of prepaid information.

Referring to FIG. 6, there is shown an exemplary configuration of the customer information unit 50. The customer information unit 50 comprises a transmission section 51, a transmission controller 52, a CPU 53, a customer database controller 54, a data storage section 55, a program storage section 56, a display section 57, and an input section 58.

The transmission section 51, connected to the customer information reception/storage section 36 of the network distribution unit 30, transmits information. The transmission controller 52 controls the transfer operations of the transmission section 51.

The CPU 53 controls the customer information unit 50 in its entirety. Namely, the CPU 53 controls, in an information distributing operation, the transfer/reception of the charging information and commands with the network distribution unit 30 and the read/write operations on the customer database 70.

These control operations by the CPU 53 are executed as instructed by a program stored in the program storage section 56. The program storage section 56 is constituted by a solid-state memory or a hard disk for example. The program storage section 56 stores the programs for accessing and managing the customer database 70, the communication with the network distribution unit 30, and the processing of data to be transmitted.

The data storage section 55 is also constituted by a solid-state memory or a hard disk for example. The CPU 53 can use the data storage section 55 to buffer the charging information read from the customer database 70 and the charging information to be newly registered on the basis of prepaid information or as an extended work memory for computational operations by the CPU 53.

The customer database controller 54 controls the customer database 70 as instructed by the CPU 53, thereby executing access operations for charging information writing, reading, and searching.

The display section 57 and the input section 58 provide an interface for the customer database manager. The display section 57 displays the images necessary for managing the customer database 70 under the control of the CPU 53. The input section 58 is used to execute various input operations for managing the customer database 70.

The charging information as shown in FIG. 7 is registered with the customer database 70. "Charging information" herein denotes a data group registered for one piece of prepaid information; for example, one piece of charging information consists of medium ID, remaining amount of money, and purchase log for example. FIG. 7 shows medium IDs ID1 through ID5 and corresponding charging information K1 through K5.

The medium ID in the charging information is one contained in the prepaid information to be described later. The remaining amount of money denotes the current prepaid remaining amount of money obtained by subtracting the charge of the purchased content from the prepaid principal every time the purchase takes place. The purchase log includes information such as date of purchase, content name, content fee, and user terminal; namely the information indicative of the state of every content purchase transaction.

Obviously, the charging information may additionally include information such as prepaid principal, medium type, medium vendor, copyright holder of purchased content, and others. The charging information may exclude the purchase log. As for the distributing operation of the system according to the invention, at least the information including medium ID and the remaining amount of money may only be included in the charging information. The other information may be set in accordance with the convenience of the distribution system or the contents of the services to be provided.

2. Prepaid Information 2-1 Structure of Prepaid Information

To receive content distributed by the information distribution system according to the invention, the user must first load the recording medium 4 recorded with prepaid information into the system. The prepaid information is recorded on the recording medium 4 in a unrewritable manner. Basically, the prepaid information consists of prepaid amount of money, prepaid service ID, and medium ID.

The prepaid amount of money is the amount of money paid by the user in advance. The recording medium 4 is sold as a virgin Mini Disc or memory card recorded with no content for example, its sale price including the prepaid amount of money. To be more specific, if the ordinary sale price of the unused recording medium is 500 yen and this recording medium is recorded with a prepaid amount of money of 5,000 yen, the user basically buys this recording medium at 5,500 yen. Obviously, the recording medium may be sold at any price; for example, 5,000 yen when the recording medium itself is free of charge or a discount amount of 4,800 yen. For the user who bought the recording medium 4 recorded with a prepaid amount of 5,000 yen, it means that he prepaid 5,000 yen for the content distribution service provided by the information distribution system according to the invention.

The prepaid service ID represents the address of the server 3 which provides the content distribution service. For example, the prepaid service ID is an address for communicating and connecting to the network distribution unit 30 in the network 2. It may be an IP address in the Internet. When the recording medium 4 is loaded, the terminal 1 accesses the server 3 on the basis of the prepaid service ID in the prepaid information to ask for connection.

Depending on the configuration of the server 3, the prepaid service ID may not be the address of the network distribution unit 30 but may be the address of the content database controller 40 or the customer information unit 50 for example.

If it is assumed that the network distribution unit 30, the content database controller 40, and the customer information unit 50 be respectively formed as Web pages on the Internet and interconnected. Then, the terminal 1 is adapted to access the content database controller 40 with the prepaid service ID being the address of the content database controller 40. In this configuration, it is possible that the customer information unit 50 be linked as the distribution processing proceeds, which is collectively processed by the network distribution unit 30.

Conversely, the terminal 1 may be adapted to access the customer information unit 50 with the prepaid service ID being the address of the customer information unit 50. In this configuration, the content database controller 40 may be linked as the distribution processing proceeds, which is collectively processed by the network distribution unit 30.

The medium ID is an identification number uniquely attached to each recording medium 4. For example, if the user purchased two prepaid recording media 4, these recording media 4 are recorded with different medium IDs.

In the prepaid information described above, 8 bits may be allocated to the prepaid amount of money, about 22 to 32 bits to the prepaid service ID, and 32 to 40 bits to the medium ID for example.

The number of bits to be allocated may be determined depending on the design of a prepaid system concerned, for example. The number of bits necessary for a server address for example to the prepaid service ID, the total number or the potential total number of prepaid media to be sold to the medium ID may be set so that different ID numbers can be sufficiently distinguished from each other. The minimum value may be 1 byte (8 bits) for prepaid amount of money, 3 or 4 bytes for prepaid service ID, and 3 or 4 bytes for medium ID, totaling about 8 bytes.

The following describes the relationship between the prepaid information recorded on the recording medium 4 and the charging information shown in FIG. 7.

For example, it is assumed that the user use the recording medium 4 recorded with medium ID=ID1 and prepaid amount of money=5,000 yen. On the server 3, charging information K1 shown in FIG. 7 is registered with the customer database 70 when this recording medium 4 has been used for the first time. Initially, for the medium ID and remaining amount of money in this charging information K1, the data in the prepaid information are registered without change; namely, the medium ID of the charging information K=ID1 and the remaining amount=5,000 yen.

Then, as content is downloaded (or recorded) to the recording medium 4, the charge for that content is subtracted from the remaining amount in the charging information K1. Namely, every time content downloading takes place, the customer database 70 is searched for the corresponding charging information on the basis of the recording medium ID in the prepaid information on the recording medium 4 and the subtraction is made from the remaining amount in the retrieved charging information.

For example, in the charging information K1, the remaining amount is 3,700 yen, which is a result of buying a piece of content for 1,300 yen by use of the recording medium whose medium ID=ID1.

As seen from the charging processing mentioned above, the prepaid information is not updated at all in the recording medium 4 owned by the user. In other words, the prepaid information may only be recorded on the recording medium 4 in a unrewritable manner. In the related-art prepaid cards, the remaining amount of money is decrementally updated in the prepaid cards themselves, while the prepaid information recorded on the recording medium 4 according to the invention is not rewritten for update.

It should be noted that the recording medium 4 may be adapted to record the prepaid information in a rewritable manner; however, it is not desirable to make the recording medium 4 rewritable in the view of preventing the prepaid amount of money or the medium ID from being falsified or the prepaid services from being abused by tampering the prepaid service ID.

2-2 Prepaid Information Recording Forms to be Used When the Recording Medium is a Mini Disc The following describes an example in which the prepaid information is recorded on the recording medium 4 in a unrewritable manner, the recording medium 4 being a Mini Disc by way of example. First, the data form and management information form on the Mini Disc will be described, followed by an example of prepaid information recording.

In a Mini Disc system, a data stream in units of one cluster is formed as recording data. FIGS. 9A and 9B show the format of each cluster providing one unit of this recording operation.

On a Mini Disc, clusters CL are continuously formed as a recording track as shown in FIG. 9A, one cluster being the minimum recording unit. One cluster is equivalent to 2 to 3 rounds of tracks. The actual reproduction time as music data is equivalent to a data amount for 2.043 seconds.

As shown in FIG. 9B, one cluster CL is composed of a linking sector consisting of 3 sectors SCFC through SCFE, a sub-data sector consisting of one sector SCFF, and a main sector consisting of 32 sectors SC00 through SC1F. Namely, one cluster is composed of 36 sectors. One sector provides a data unit which consists of 2,352 bytes.

The linking sector SCFC-SCFE is used to provide a buffer between recording operations or adjust various operations. The sub-data sector SCFF is used to record information set as sub-data. TOC (Table Of Contents) data providing management information and audio data providing content as referred to in the present embodiment are recorded on the main sector SC00-SC1F consisting of 32 sectors.

Figures 10A, 10B:
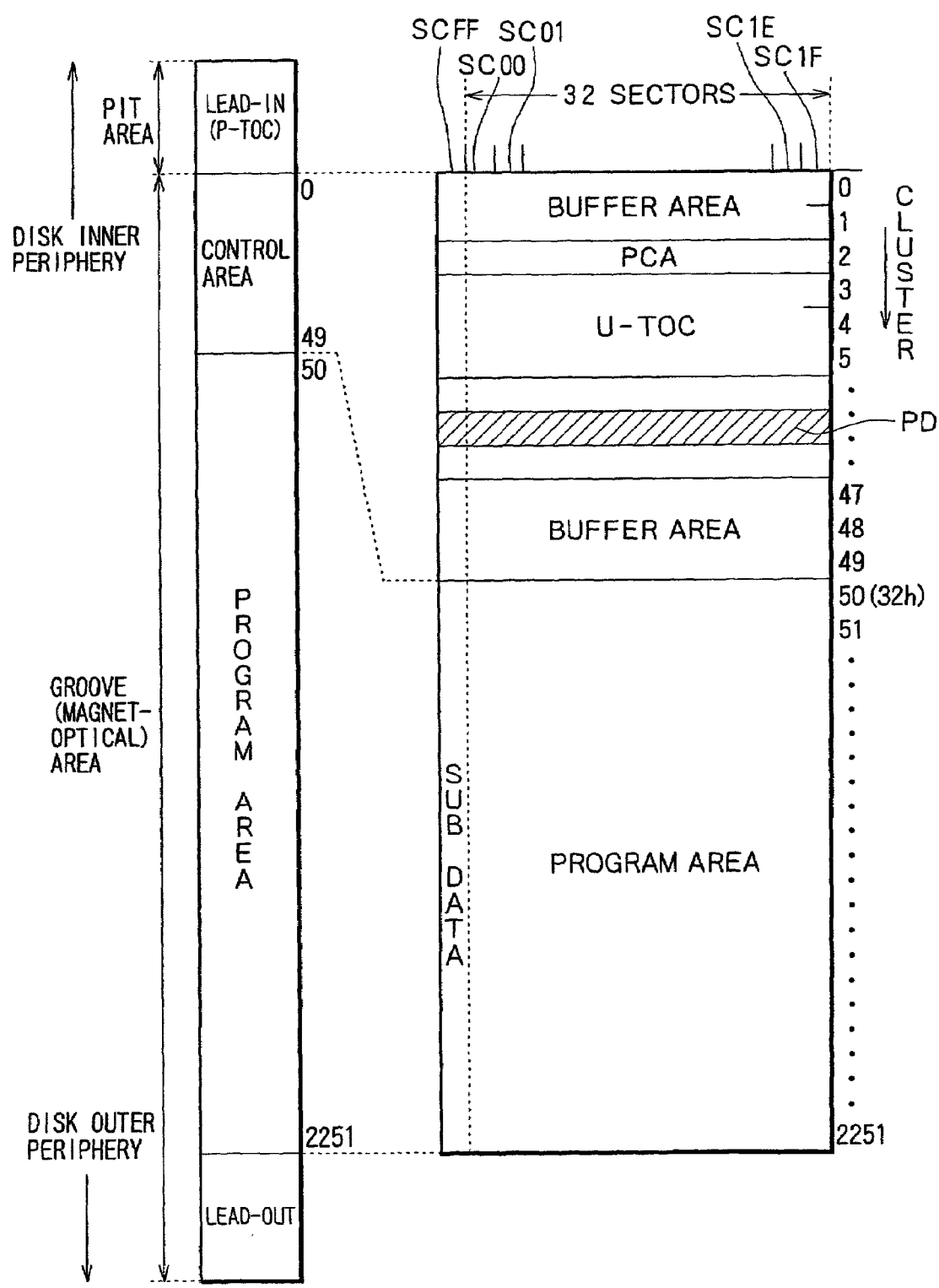
FIG. 10A illustrates the area structure of a magneto-optical disc to which the invention is applied.
FIG. 10B illustrates the data structure of the control area of the magneto-optical disc of FIG. 10A.

FIGS. 10A and 10B illustrate a Mini Disc area structure. FIG. 10A illustrates an area from the innermost periphery to the outermost periphery of a Mini Disc. On a Mini Disc, which is a magneto-optical disc, the innermost periphery side provides a pit area in which reproduction-only data are formed by emboss pits and a P-TOC providing management information is recorded.

The outer periphery relative to the pit area is referred to as a magneto-optical area providing a recording and reproduction enabled area formed with guide grooves of recording tracks.

In this magneto-optical area, a section of the innermost clusters 0 through 49 provides a control area. A piece of music content for example is recorded as one track in a program area consisting of clusters 50 through 2251. The outer periphery relative to the program area provides the lead-out area.

FIG. 10B illustrates the control area in detail. In FIG. 10B, the sectors (without the linking sectors) extend horizontally while the clusters extend vertically.

In the control area, clusters 0 and 1 provide a buffer area for providing a buffer with the pit area. Cluster 2 provides a power calibration area PCA which is used to adjust laser beam output power.

Clusters 3, 4, and 5 record a U-TOC. In the U-TOC, which will be detailed later, a data format is specified for each of plural predetermined sectors of the 32 main sectors (SC00 through SC1F) in one cluster, predetermined control information being recorded in each of these predetermined sectors. Namely, the U-TOC sector is adapted to record the addresses of the tracks recorded in the program area and the addresses of free areas and the information such as the track names and recording dates of these tracks.

The cluster having the sectors constituting the U-TOC data is recorded repeatedly recorded in clusters 3, 4, and 5. The clusters 47, 48, and 49 provide a buffer area with the program area.

In the program area following cluster 50 (=32h in hexadecimal notation), audio data such as music for example are recorded as compressed in ATRAC (Adaptive Transform Acoustic Coding) or ATRAC2 or ATRAC3 algorithm in each of 32 main sectors SC00 through SC1F in one cluster. The recorded programs and recordable areas are managed by U-TOC.

In the present example, an area in which a U-TOC area for example is formed in the groove area provides the control area. The control area may include this control area and the inner periphery lead-in area in which P-TOC is recorded in contrast to the program area in which content is recorded.

For the control information to be recorded in the control area, the P-TOC sector will be described first.

P-TOC information includes the specification of recordable areas (or program areas) on the Mini Disc and the management of the U-TOC area.

In the P-TOC area, a control information format is specified for each sector and required control information is recorded in each section. The P-TOC sector thus formed is repeatedly formed in the lead-in area.

The following describes P-TOC sector 0 which provides the most basic control information. The description of the P-TOC sectors following sector 1 is omitted.

FIG. 11 illustrates the format of P-TOC sector 0.

The data area (4 bytes×588=2352 bytes) in P-TOC sector 0 is recorded at its starting position with 12-byte synchronous patterns constituted by 12 pieces of 1-byte data "00000000" and "11111111".

These synchronous patterns are recorded to every sector on the Mini Disc.

Next, cluster addresses (Cluster H) and (Cluster L) and sector address (Sector) are recorded over 3 bytes, followed by 1-byte of mode information (MODE), thereby forming a header. The 3-byte addresses are addresses of these sectors themselves.

The header is followed by an identification in ASCII codes representing character "MINI" at predetermined positions.

This identification is followed by disc type, recording power, first recorded music number (First TNO), last recorded music number (Last TNO), lead-out start address $LO_A$, power calibration area start address $PC_A$, U-TOC start address $UST_A$, and recordable user area start address $RST_A$.

The lead-out start address $LO_A$ indicates the start address of the lead-out area shown in FIG. 10A. The power calibration area start address $PC_A$ indicates the start address of the power calibration area PCA shown in FIG. 10A.

The U-TOC start address $UST_A$ indicates the start address of the U-TOC area. The recordable user area start address $RST_A$ indicates the start address of the program area.

Next come a pointer section containing pointers (P-TNO1 through P-TNO255) and a table section containing part tables (01F) through (FFh). These sections are used to manage the recorded pieces of music if they are all recorded on a play-only pre-recorded disc by emboss pits. With the information distribution system according to the present invention, these sections are not used and the controlling scheme is basically the same as that of U-TOC sector 0 to be described later and therefore need not be described.

The following describes the U-TOC sector. In order to execute a content (track) recording or reproducing operation on or from a Mini Disc, the drive unit must read the P-TOC and U-TOC, which are control information of the Mini Disc, from the Mini Disc beforehand and reference these tables as required.

The U-TOC sector can record various kinds of control information by use of the sectors SC00 through SC1F in the cluster, which is the U-TOC area. Currently, however, sector 0 (SC00) is specified as a basic content management sector, sector 1 (SC01) and sector 4 (SC04) as an area for recording text information, sector 2 (SC02) as an area for recording a date of recording, and sector 3 (SC03) as an area for recording ISRC (International Standard Recording Code) information. The following describes U-TOC sector 0 which is always necessary for Mini Disc recording and reproducing operations.

U-TOC sector 0 is a data area which records content such as newly recorded music and the control information about free areas to which content can be newly recorded. For example, when a piece of music is to be recorded on a Mini Disc, the drive unit searches U-TOC sector 0 for a free area on the disc and records the music data in the retrieved free area. When a piece of music is to be reproduced, the drive unit searches U-TOC sector 0 for an area in which the desired piece of music is recorded and accesses the retrieved area for reproduction.

FIG. 12 illustrates the format of U-TOC sector 0. Like above-mentioned P-TOC sector 0, The 16-byte header records 12-byte synchronous patterns, cluster addresses (Cluster H) and (Cluster L), sector address (Sector), and mode information (MODE).

Next come maker code, model code, first track number (First TNO), last track number (Last TNO), sector used status (Used sectors), disc serial number, and disc ID.

With the 1-byte sector used status (Used sectors), the 8 bits of this 1 byte correspond to U-TOC sectors 0 through 7 respectively. When a bit is "1", it indicates that the corresponding sector is in use.

Next comes a pointer section in which various pointers (P-DFA, P-EMPTY, PFRA, and P-TNO1 through P-TNO255) are recorded to the area in which tracks (content) are recorded and a free area by relating them to the table section to be described below.

The pointer section is followed by the table section in which 255 part tables 01h through FFh are provided to be related by the pointers (P-DFA through P-TNO255) to the track areas and free areas. Every part table records the start and end addresses of a corresponding part and the mode information (track mode) of that part. In addition, because a part indicated by every part table may be linked another part, every part table can record the link information indicative of a part table recording the start and end address of the destination part.

It should be noted that "part" used herein denotes a portion of one track in which temporally continuous data are recorded in a physically continuous manner.

The start and end addresses indicate the address of one or more parts which constitute one piece of music (or one track).

With a Mini Disc, a piece of music to be recorded by the user may be recorded in plural parts for the purpose of increasing the usage efficiency of the recordable area because there is no problem in reproducing one piece of content data (or one track) physically discontinuously, namely in reproducing one piece of content recorded over plural parts.

To implement such a manner of reproduction, the link information is provided; for example, specifying the part tables to be linked with each other by use of the numbers assigned to these part tables allows to link the part tables to link for reproduction of the above-mentioned piece of content recorded over plural parts.

Namely, in the table section in U-TOC sector 0, one part table represents one part; for example, a piece of music constituted by 3 linked parts is managed in part position by 3 part tables linked each other by the link information.

For the part tables 01h through FFh in the table section of U-TOC sector 0, the contents of the parts are indicated by the pointers (P-DFA, P-EMPTY, P-FRA, and P-TNO1 through P-TNO255) as shown below.

Pointer P-DFA indicates a defective area on the Mini Disc, specifying one part table or the first one of plural part tables in which a defective track portion (namely, a defective part) caused by a scratch for example is indicated. Namely, if there exists a defective part, one of 01h through FFh is recorded in pointer P-DFA and the part table pointed by this pointer indicates the defective part by its start and end addresses. If there is another defective part, another part table is specified as the link information of the part table indicating that defective part and the specified table also indicates this defective part. If there is no other defective part, the link information indicates "00h" for example, denoting there is no further link.

Pointer P-EMPTY indicates one unused part table or the first part table of two or more unused part tables. If there exists an unused part table, one of 01h through FFh is recorded as pointer P-EMPTY.

If there are two or more unused part tables, the part tables are sequentially specified by the link information from the part table pointed by pointer P-EMPTY, linking all unused part tables in the table section.

Pointer P-FRA indicates a free area in which data can be written on the Mini Disc, specifying one part table or the first part table of two or more part tables indicating a track portion (namely, a part) which provides a free area. Namely, if there exists a free area, one of 01h through FFh is recorded in pointer P-FRA and the corresponding part table indicates a part, which is a free area, by its start and end addresses. If there are two or more such parts, namely there are two or more part tables, they are sequentially specified by the link information until "00h" is reached.

Figure 13:
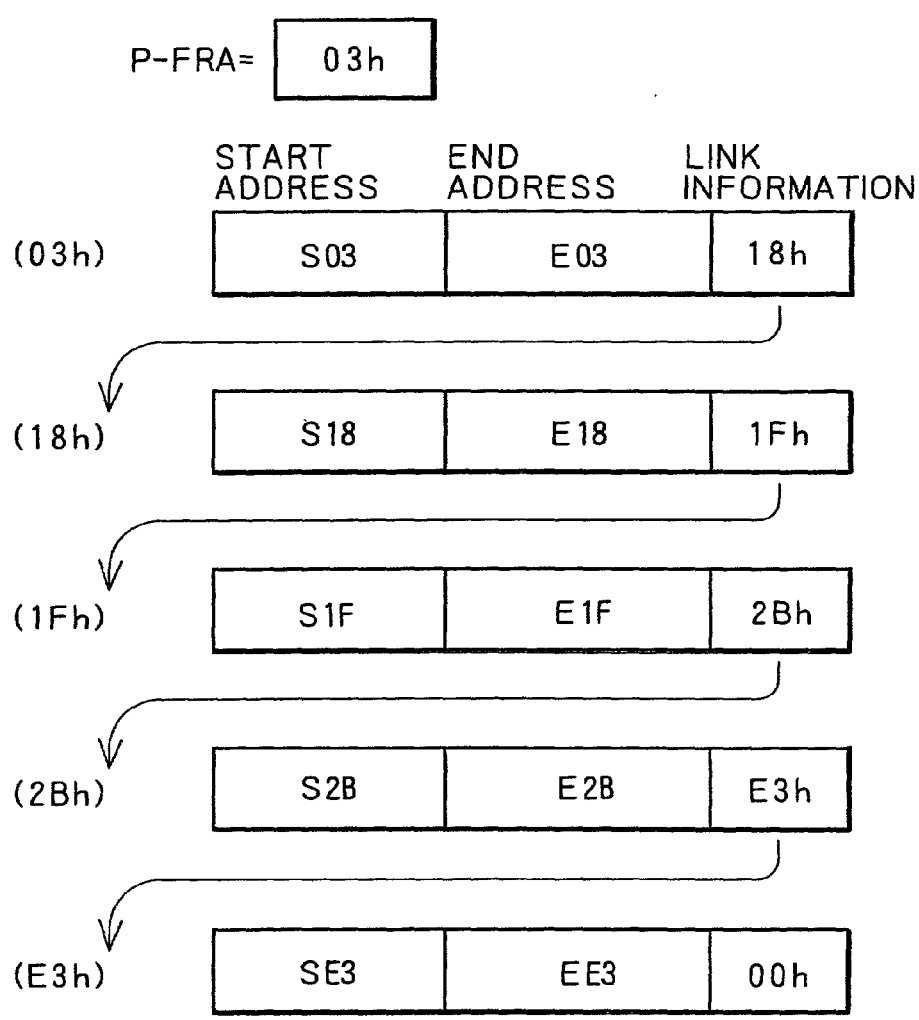
FIG. 13 is a link diagram illustrating the linking between discretely recorded parts.

FIG. 13 schematically illustrates how the parts providing free areas are managed by part tables. This figure shows a state in which, when parts 03h, 18h, 1Fh, 2Bh, and E3h are free areas, these parts are shown by linking them each other following pointer P-FRA. The same control form also applied to the above-mentioned defective areas and unused part tables.

Pointers P-TNO1 through P-TNO255 indicate the tracks of music for example recorded on the Mini disc. For example, pointer P-TNO1 points at a part table indicative of one or the temporally first one of plural parts recorded with the data of the first track.

If, for example, a piece of music recorded in the first track is recorded on the disc without skipping in the first track, namely recorded in only one part, then the recording area of the first track is recorded in the start and end addresses in the part table pointed by pointer P-TNO1.

If, a piece of music recorded in the second track for example is recorded discretely over plural parts on the disc, these parts are specified in a sequence of time in order to indicate the recording positions of the second track. Namely, starting the part table pointed by pointer P-TNO2, other part tables are linked each other by the link information in a sequence of time up to a part table with which the link information becomes "00h" (the same form as shown in FIG. 13).

When all parts recorded with the data constituting a second piece of music for example are sequentially recorded as described above, the use of the data in U-TOC sector 0, in reproducing the second piece of music or overwriting the area of the second piece of music, allows the read/write head to appropriately access the discretely arranged parts to retrieve the continuous music information or to record information by efficient use of the recording area.

Thus, with a data rewritable Mini Disc 90, the area control on the disc is executed by P-TOC and the music for example recorded in the recordable user area and the free areas are controlled by U-TOC.

If a Mini Disc having the above-mentioned control information structure is used as the recording medium 4 which can be used in the information distribution system according to the present invention, the prepaid information is recorded in a unrewritable manner.

If it is assumed here that the prepaid information is 8 bytes wide, then it may be recorded in one of the following manners:

(1) the prepaid information is recorded within P-TOC;
(2) the prepaid information is recorded within U-TOC in a unrewritable manner; and
(3) the prepaid information is recorded outside U-TOC but in the control area in a unrewritable manner.

If the prepaid information is recorded in P-TOC, an unused 8-byte area PD indicated by hatching in P-TOC sector 0 shown in FIG. 11 for example is used for the recording.

Obviously, the prepaid information may also be recorded in another unused area in P-TOC or a predetermined area in or subsequent to P-TOC sector 1.

Thus, if the prepaid information is recorded in P-TOC, the prepaid information is recorded by emboss pits; namely, the prepaid information thus recorded becomes unrewritable information, thereby making it suitable for the information distribution system according to the present invention. If the drive unit 10 is Mini Disc compatible, P-TOC is first read upon loading of the disc, accompanied by the reading of the prepaid information, which is suitable for the information distribution system according to the present invention.

However, the medium ID in the prepaid information must be different from disc to disc to identify a particular recording medium 4 from among mass-produced recording media 4.

Generally, P-TOC formed by emboss pits is formed in a stamping process in Mini Disc fabrication processing. Therefore, it takes a lot of troubles to record the prepaid information which is different from disc to disc. Consequently, the above-mentioned manner of recording the prepaid information in P-TOC has its drawback in view of the mass production of prepaid medium.

On the other hand, the method in which the prepaid information is recorded in U-TOC or the control area does not involve the above-mentioned drawback in fabrication presents no difficulty in recording the prepaid information having a medium ID which differs from disc to disc. In this case, however, means for making the prepaid information unrewritable is required.

In recording the prepaid information in U-TOC, an unused area in already formatted sector 0, 1, 2, 3 or 4 may be used. In order to appropriately eliminate the possibility for the prepaid information to be rewritten, a sector not yet specified may be used.

Figure 14:
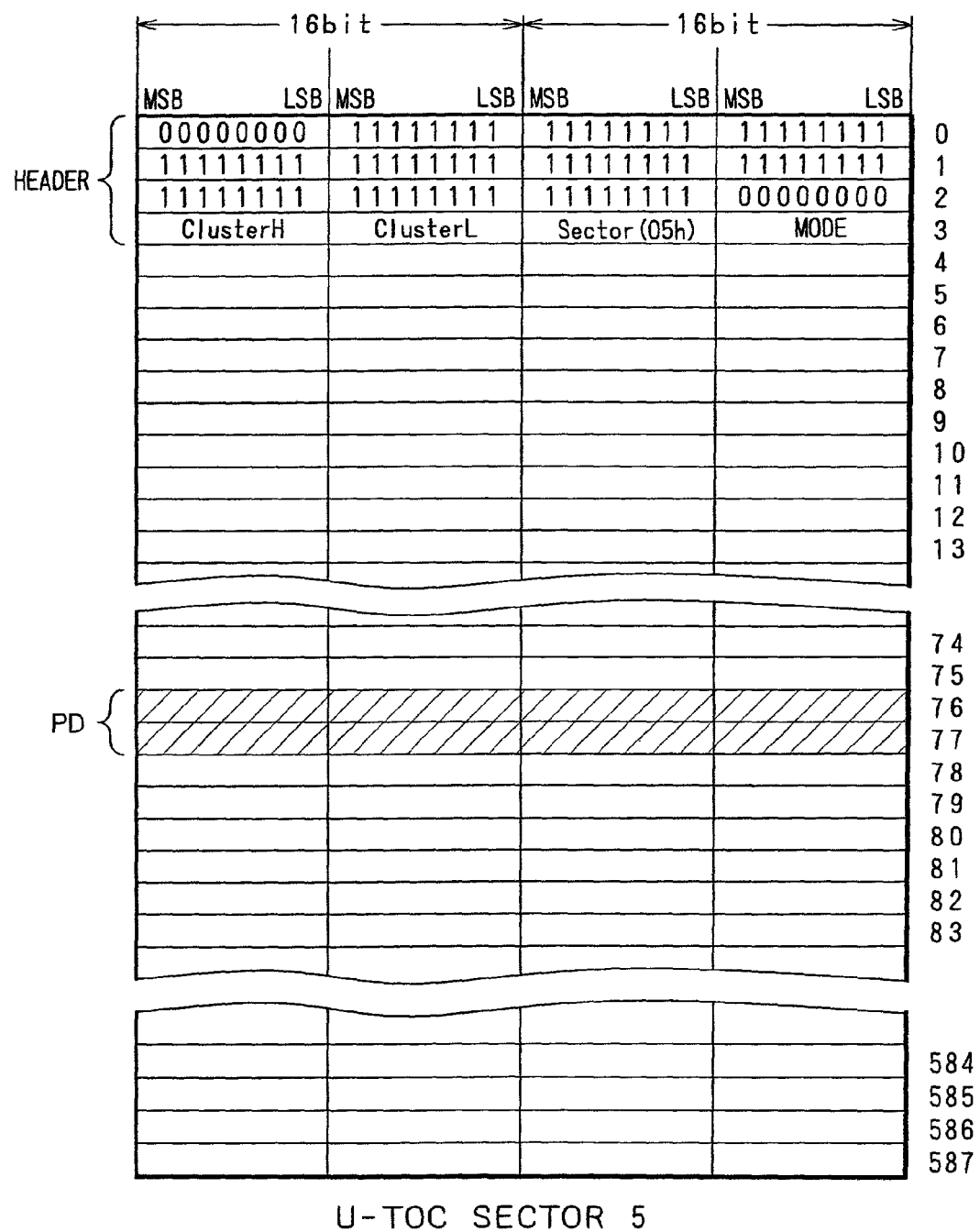
FIG. 14 illustrates the data structure of U-TOC sector controlled by the control area of the magneto-optical disc of FIG. 10A.

For example, U-TOC sector 5 is specified as shown in FIG. 14. Namely, except for the header, the predetermined 8 bytes are set as a prepaid information recording area PD.

In addition, in the above-mentioned U-TOC sector 0, the corresponding bit of sector 5 in sector usage status (Used sectors) is set to "0" indicative that this sector is not in use.

In this case, a general Mini Disc recorder recognizes U-TOC sector 5 as a sector not in use, so that no updating process is executed on U-TOC sector 5. Namely, the prepaid information becomes unrewritable by the user.

In the recording unit 10 used in the information distribution system according to the present invention, the prepaid information can be read by reading U-TOC sector 5 on the basis of an application program for prepaid information reading.

In the above description, sector 5 is used. It will be apparent that sector 6, sector 7 or another sector may be used.

In the method in which the prepaid information is recorded outside U-TOC but inside the control area shown in FIG. 10, the prepaid information may be recorded by use of a sector in an unused cluster as indicated by hatching shown in FIG. 10B.

In the control area, a power calibration area PCA and a U-TOC area are formed and their positions are indicated by P-TOC as shown above. Referencing P-TOC allows a normal Mini Disc recorder to access the power calibration area PCA and the U-TOC area.

However, the hatched portion PD of which position is not indicated by P-TOC cannot be accessed by a normal Mini Disc recorder (an area insignificant if accessed). Therefore, the prepaid information recorded in the hatched portion PD is unrewritable by the user.

In the recording unit 10 used in the information distribution system according to the present invention, the prepaid information can be read by executing the reading of the hatched portion PD on the basis of an application program for prepaid information reading. For example, the prepaid information can be read by the recording unit 10 by setting the start position of the hatched portion PD to a position obtained by giving a predetermined offset to U-TOC start address $UST_A$ indicated by P-TOC. For example, because U-TOC is recorded over 3 clusters, a position which is U-TOC start address $UST_A$ plus 5 clusters may be specified as the start position of the prepaid information recording area.

Thus, by use of one of the above-mentioned three prepaid information recording methods, a Mini Disc can be used as the prepaid medium 4.

In the above description, 8 bytes are used as the width of the prepaid information. It will be apparent that another data size may also be used, which presents no problem because P-TOC, U-TOC and the control area have enough room for accommodating these data sizes.

In the above description, a Mini Disc is used for example. It will be apparent that a memory card, a CD-R, a CD-RW, a DVD-R, a DVD-RAM, a DVD–RW, or DVD+RW for example may also be used as long as the position of recording the prepaid information of 8 bytes or more wide is set on the basis of the control format of such a recording medium.

3. Content Distribution Processing

3-1 Distribution Processing Procedure

Figure 15:
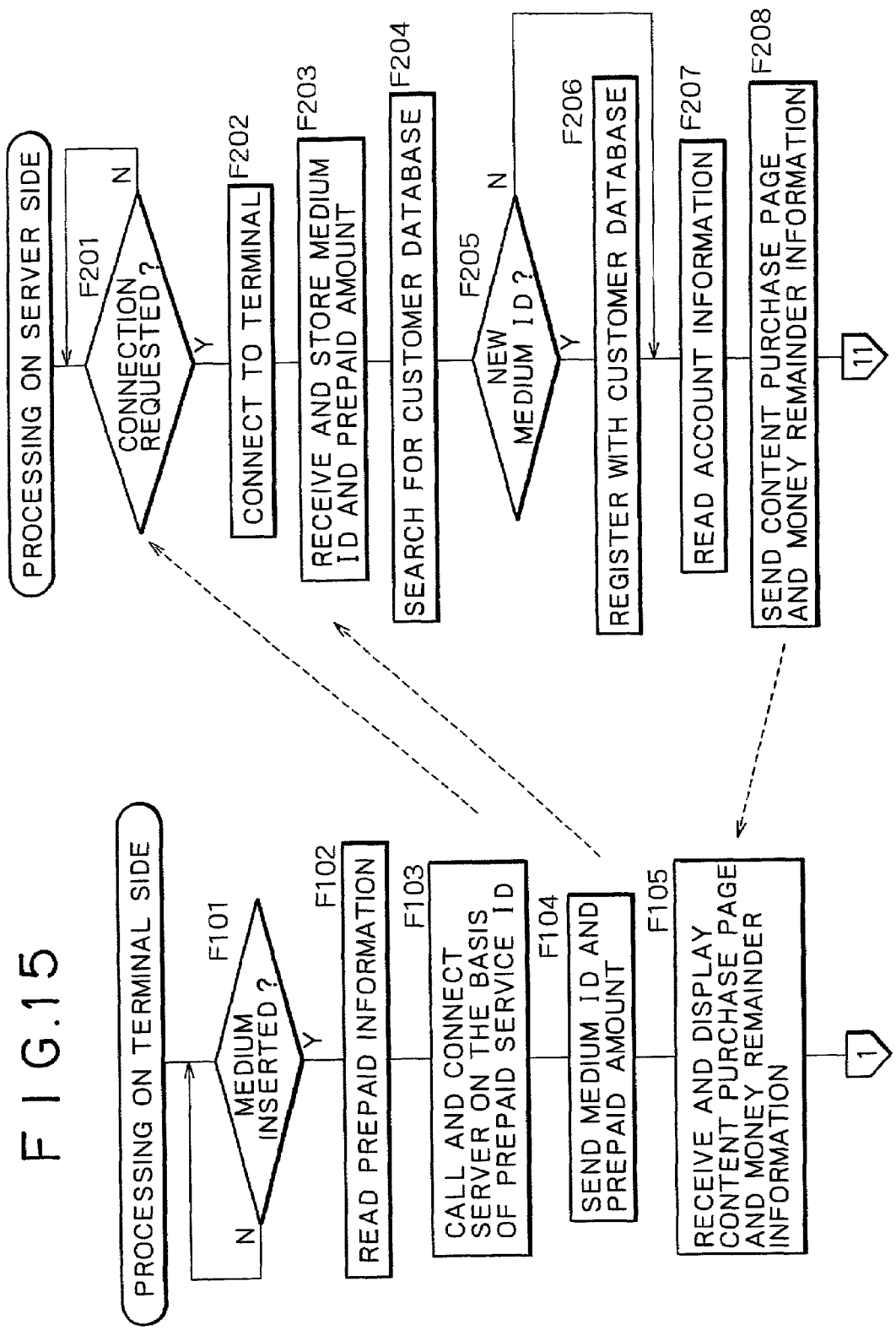
FIG. 15 is a flowchart describing the processing of the terminal side and the server side to be executed for content downloading.
Figure 16:
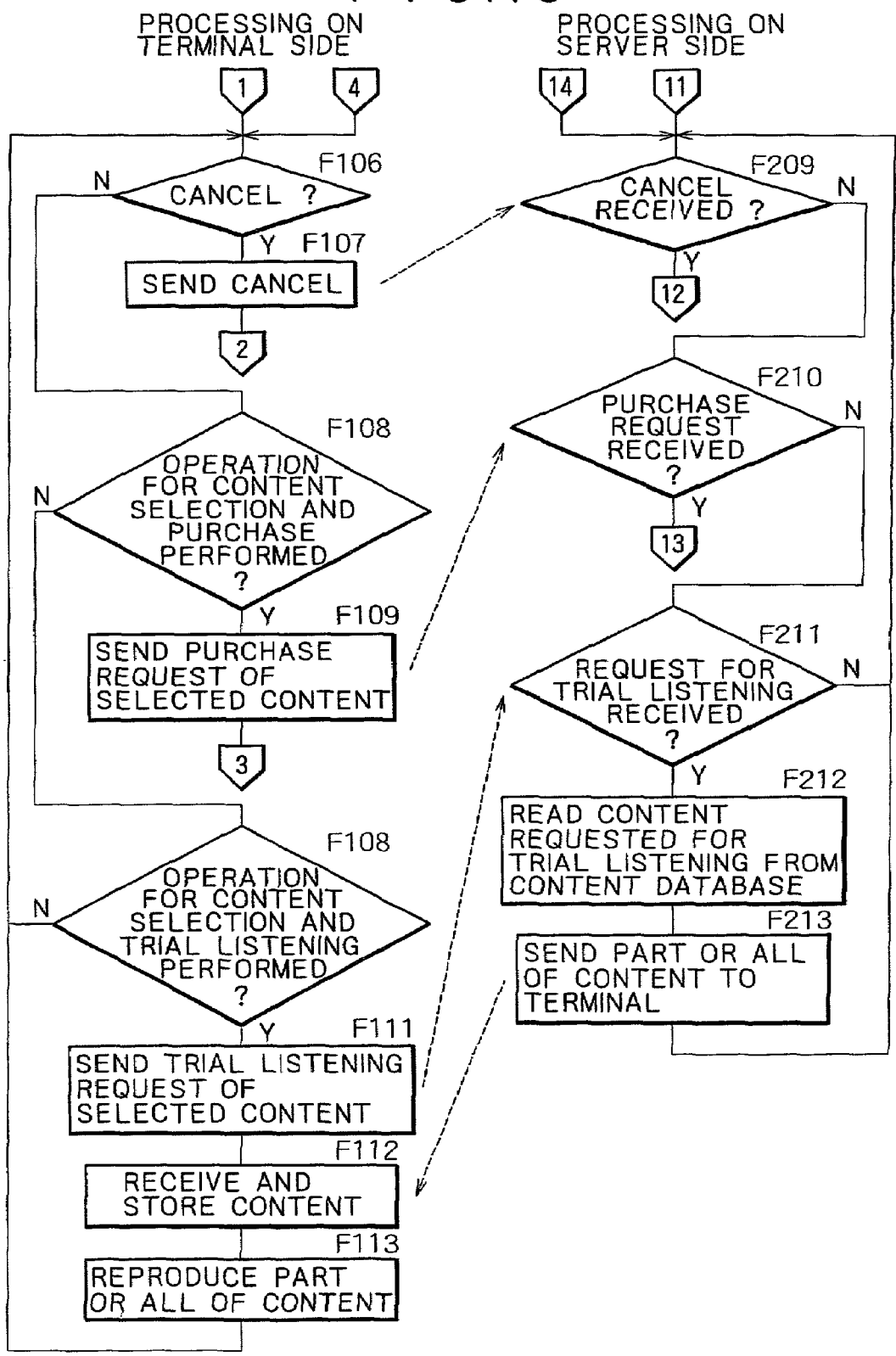
FIG. 16 is another flowchart describing the processing of the terminal side and the server side to be executed for content downloading.
Figure 17:
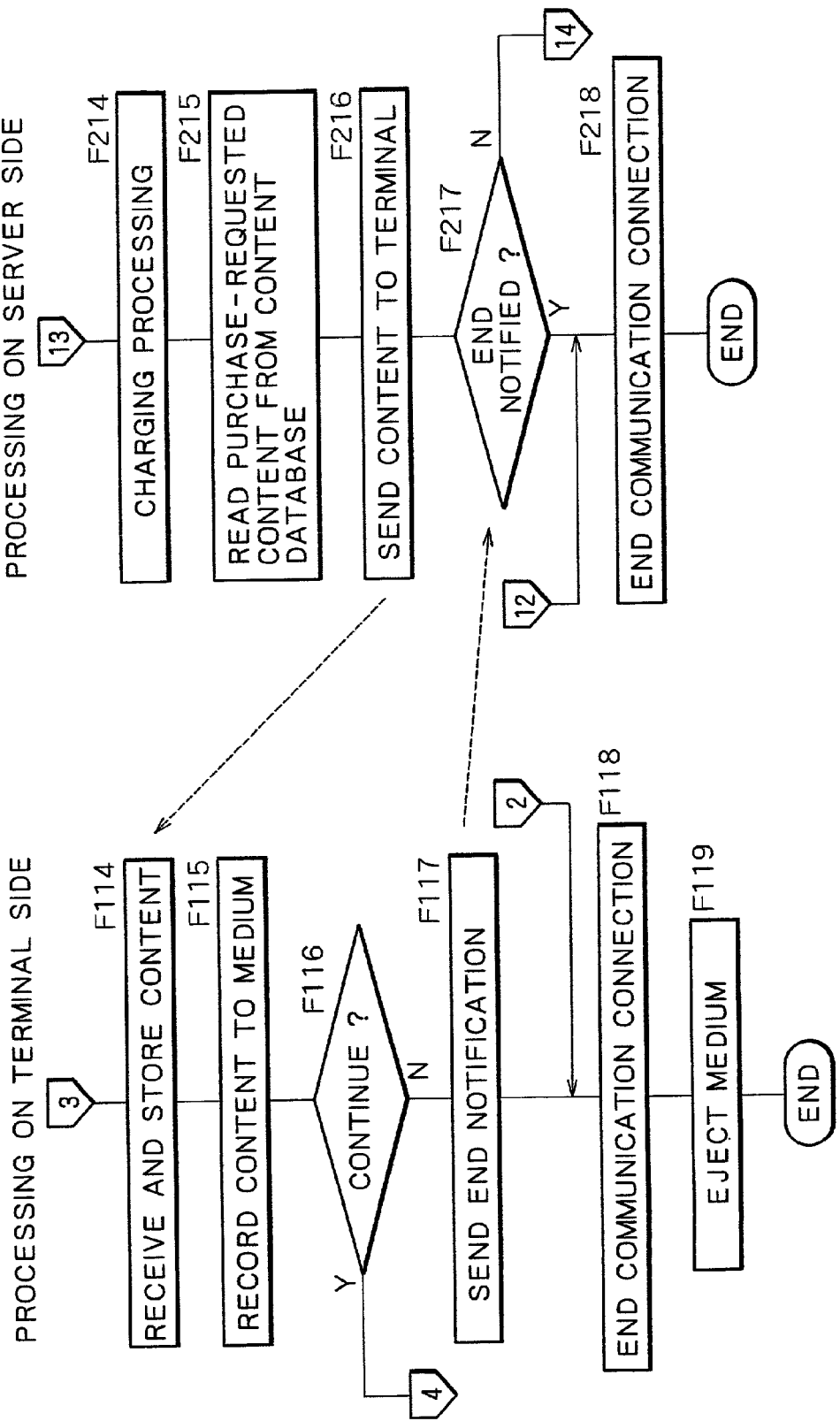
FIG. 17 is a still another flowchart describing the processing of the terminal side and the server side to be executed for content downloading.

The following describes the processing for content distribution to be executed by the information distribution system according to the present invention with reference to the flowcharts shown in FIGS. 15, 16, and 17. It should be note that these figures show the processing of the terminal 1 and the processing of the server 3 in parallel. The processing of the terminal 1 is executed mainly on the basis of the control by the CPU 23 of the network connection unit 20. The processing of the server 3 is executed mainly on the basis of the control by the distribution service management system 33 and the customer information link section 34 in the network distribution unit 30.

When the user wants to receive a content distribution service, the user loads the recording medium 4 purchased in advance and recorded with the prepaid information into the recording unit 10.

Upon detection of the loading of the recording medium 4 into the recording unit 10, the procedure goes from step F101 to step F102 shown in FIG. 15 to execute the reading of the prepaid information from the loaded recording medium 4. Namely, the CPU 23 instructs the recording unit 10 to read and transfer the prepaid information. Then, the CPU 23 stores the prepaid information transferred from the recording unit 10 into an internal register of the CPU 23 or the data storage section 26 for example.

In step F103, the terminal 1 requests communication connection on the network 2 on the basis of the prepaid service ID contained in the prepaid information and calls the server 3 to establish the communication connection with the server 3.

When requested for the communication connection based on the prepaid service ID, the server 3 (namely the network distribution unit 30) goes from step F201 to step F202 to execute a communication connection process for the requesting terminal 1.

When the communication connection has been established, then, in step F104, the terminal 1 sends the medium ID and prepaid amount data contained the prepaid information to the server 3.

Receiving the medium ID and the prepaid amount data, the server 3 stores them in the customer information link section for example in step F203.

In step F204, the server 3 searches the customer database 70 on the basis of the received medium ID. To be more specific, the customer information link section 34 instructs the customer information unit 50 connected via the customer information reception/storage section 36 to search the customer database 70 for charging information K(n) which matches the medium ID.

If the recording medium 4 in use by the user is used for the first time for the distribution service, then the charging information corresponding to the medium ID contained in the prepaid information of this medium 4 has not been registered with the customer database 70.

Therefore, if no charging information matching the medium ID is found by the customer information unit 50, then the procedure goes from step F205 to step F206 to newly register the charging information. To be more specific, by use of the medium ID and prepaid information received from the terminal 1 and stored in the customer information link section as described above, the server 3 generates charging information from the medium ID and the prepaid amount of money. Then, the server 3 sends the generated charging information to the customer information unit 50, which newly registers the received charging information with the customer database 70.

On the other hand, if the medium ID is found of the recording medium 4 which has been used at least once in the past, the charging information based on this medium ID has already been registered with the customer database 70. In this case, the procedure goes from step F205 to step F207, in which the customer information link section 34 instructs the customer information unit 50 to read the corresponding charging information from the customer database 70 and send the charging information to the customer information reception/storage section 36 to store the charging information therein.

It should be noted that, when the charging information is newly registered as in step F206, the newly registered charging information is stored in the customer information reception/storage section 36 in step F207.

When the reading of the charging information corresponding to the medium ID of the recording medium 4 loaded by the user has been completed, then, in step F208, the service management system section 33 of the server 3 sends the purchase menu page data for the content which is stored in the content database 60 and is downloadable to the user to the terminal 1. For example, if the content database controller 40 prepares the content purchase menu page data, they are sent to the terminal 1.

Because the remaining prepaid amount can be known from the charging information retrieved and stored in the customer information reception/storage section 36, the distribution service management system section 33 also sends the obtained information of remaining prepaid amount to the terminal 1.

Upon reception of the content purchase page data and the remaining prepaid amount, the terminal 1 causes the display section 28a to display the received data in step F105, presenting the purchase menu and the remaining prepaid amount to the user.

In response to such presentation, the user performs an input operation through the input section 29. The input operation is for cancellation, purchase, or trial listening. The CPU 23 of the terminal 1 monitors the operation to be executed in step F106, F108, or F110 shown in FIG. 16.

Checking the purchase menu and the remaining prepaid amount, if the user does not want to buy the content, the user executes a cancel operation through the input section 29.

Then, the procedure of the terminal 1 goes from step F106 to step F107 in FIG. 16 to send cancel information to the server 3.

When the cancel information is received by the server 3, the procedure goes from step F209 to step F218 shown in FIG. 16, in which the distribution management system section 33 of the server 3 ends the communication connection with the terminal 1, thereby ending the above-mentioned sequence of processes.

After the transmission of the cancel information, the procedure goes to step F118 shown in FIG. 17, in which the CPU 23 of the terminal 1 executes a process of ending the communication connection with the server 3 and ejects the recording medium 4 from the recording unit 10, upon which the above-mentioned sequence of processes comes to an end.

In the present embodiment, the user can give a trial listening on content (music for example) before buying it by checking the content purchase menu.

For example, if the user wants to know the contents of a particular music title listed in the purchase menu, the user can selects that music title for trial listening.

If a trial listening request is inputted through the input section 29, the procedure of the CPU 23 goes from step F110 to step F111 shown in FIG. 16, in which the CPU 23 sends the content identifying information selected by the user to the server 3 along with a request for the trial listening of that content.

Receiving the request for trial listening, the service management system section 33 of the server 3 proceeds from step F211 to F212 shown in FIG. 16 to instruct the content database controller 40 to read the content requested for trial listening from the content database 60.

Next, in step F213, the distribution service management system section 33 sends a part or all of the content data to the terminal 1.

Receiving the content data for trial listening from the server 3 in step F112, the CPU 23 of the terminal 1 stores the content data into the data storage section 26. In step F113, the CPU 23 causes the audio output section 28b to reproduce a part or all of the content. Thus, the user can get trial listening on the requested content.

Obviously, if the content is image data or text data, they can be displayed on the display section 28a.

The reason why the content for trial listening is reproduced partially or totally is that, for the purpose of trial listening, the content may only be reproduced partially. For example, if the content is a piece of music, its introduction part, first melody part, a bridge, or one chorus part may be reproduced.

Therefore, if, for example, a collection of these parts of content is stored in the content database 40 for the purpose of trial listening, then these parts may be provided to the terminal 1. Alternatively, parts may be extracted from the content data stored in the content database 60 and the extracted parts may be sent to the terminal 1.

Alternatively, on the terminal 1 side, the CPU 23 may extract only parts of the content data stored in the data storage section 26 and reproduce the extracted parts.

When purchasing a particular piece of content, the user may select it from the displayed purchase menu.

When the purchase operation is performed by the user through the input section 29, the procedure of the CPU 23 goes from step F108 to step F109 shown in FIG. 16, in which the CPU 23 sends the content identifying information selected by the user to the server 3 along with a request for purchasing that content.

It should be noted that, at this time, the CPU 23 also sends the remaining storage capacity of the recording medium 4 to the server 3. This is because the charging processing shown in FIG. 19 to be described later must be executed. The remaining storage capacity of the recording medium 4, the information about how long music data can be recorded for example, can be determined from the control information of the recording medium 4. In the case of the above-mentioned Mini Disc for example, the recordable capacity can be determined from the information recorded in the free area of U-TOC sector 0.

Receiving the purchase information, the procedure of the distribution service management system section 33 of the server 3 goes from step F210 in FIG. 16 to step F214 shown in FIG. 17 to execute charging processing for the charge of the content requested for purchase.

In this charging processing, the charging information stored in the customer information reception/storage section 36, namely the charging information corresponding to the prepaid information of the recording medium 4, is updated in the remaining amount of money and the updated charging information is updated in the customer database 70. For example, if the fee of the selected content is 200 yen, 200 yen is subtracted from the remaining amount in the charging information registered with the database 70.

If the purchase log information is included in the charging information as shown in FIG. 7, the charging information is updated with respect to the content purchase made this time by adding the log information such as content name (music title for example), purchase date, and amount of money paid for the purchased content for example.

It should be noted that, in this charging processing, a simple charge subtraction process may not be executed depending on the relationship between remaining prepaid amount and content price and the relationship between the remaining recording capacity of the recording medium 4 and the data size of content, which will be described in detail with reference to FIGS. 18 and 19.

Next, the distribution service management system section 33 instructs the content database controller 40 in step F215 to read the content requested for purchase from the content database 60.

In step F216, the distribution service management system section 23 sends all or part of the retrieved content data to the terminal 1.

The CPU 23 of the terminal 1 receives the content data downloaded from the server 3 in step F114 and stored the downloaded content data into the data storage section 26. In step F115, the CPU 23 transfers the content data to the recording unit 10 to record the content data to the recording medium 4. Thus, the user has purchased the requested content.

For the user continues his operation for purchasing another item of content, the procedure returns to step F106 shown in FIG. 16 and the procedure on the server 3 side also returns to step F209 shown in FIG. 16.

If the user has performed an operation for ending the content purchase, the procedure of the CPU 23 goes to step F117 to send an end notification to the server 3.

In step F118, the CPU 23 executes a communication connection end process and, in step F119, ejects the recording medium 4, ending the content purchase processing.

Receiving the end notification, the procedure of the server 3 goes from step F217 to step F218, upon which the communication connection with the terminal 1 is ended to end the content purchase processing.

Consequently, the user can purchase desired content by use of the recording medium 4 recorded with the prepaid information without inputting a credit card number for charge settlement or inputting the card number of a dedicated prepaid card. This significantly facilitates content purchasing. Especially, this allows those users who is unfamiliar with the operation of computers or other devices or who have no credit card to access the content distribution services.

In addition, because the settlement based on the prepaid information is executed in the form of updating the registered charging information in accordance with the prepaid information on the server 3 side, the prepaid information of the recording medium 4 need not be updated.

Further, because the prepaid information of the recording medium 4 is stored in a unrewritable manner, the recording medium 4 can be protected from abuse.

3-2 Charging Processing

As described above, in the charging processing in step F214, a simple content accounting process may not be executed depending on the relationship between remaining prepaid amount and content price and the relationship between the remaining storage capacity of the recording medium 4 and the data size of content. The following describes the charging processing of the present embodiment by taking the above-mentioned point into consideration.

It is assumed here that the user of the terminal 1 has two recording media 4 shown in FIG. 18. One recording medium 4 has a medium ID=ID1, of which prepaid outstanding balance is X1 (yen) in the charging information registered with the customer database 70. The remaining storage capacity of this recording medium 4 is A1 (minutes). Namely, any music content of which play time is less than A1 (minutes) can be recorded in this recording medium 4.

The other recording medium 4 has a medium ID=ID2, of which prepaid outstanding balance is X2 (yen) in the charging information registered with the customer database 70. The remaining storage capacity of the this recording medium 2 is A2 (minutes).

It should be noted that, for the convenience of description, the first recording medium is referred to as the ID1 recording medium while the second as the ID2 recording medium.

It is assumed again that the user having the two recording media, the ID1 recording medium and the ID2 recording medium, has started a content purchase operation by loading the ID1 recording medium in step F101 shown in FIG. 15.

The user selects a particular piece of content and executes a purchase operation in accordance with the above-mentioned procedure. The data size of the content requested for purchase is B (minutes) and the price is Y (yen).

On this assumption, the charging process in step F214 shown in FIG. 17 is executed in a procedure shown in FIG. 19.

Because the ID1 recording medium is loaded, the server 3 recognizes that the remaining prepaid amount of this user is X1 (yen) from the registered charging information.

Therefore, the server 3 determines in charging processing whether the charge Y of the content requested for purchase can be covered by the prepaid remaining amount X1. As described, because the recordable capacity A1 (minutes) of the ID1 recording medium is notified from the terminal 1, the server 3 compares the recordable capacity A1 (minutes) with the data size B (minutes) of the content requested for purchase to determine whether the content can be recorded to the ID1 recording medium.

After the comparison between the amount of money and the data size, the procedure branches to one of the following four processes.

(1) $X1 \geq Y$, $A \geq B$: the ID1 recording medium has both a remaining amount of money and a recordable capacity enough for the content purchased this time.
(2) $X1 \geq Y$, $A<B$: the ID1 recording medium has a remaining amount of money enough for the content purchased this time but not an enough recordable capacity.
(3) $X1<Y$, $A \geq B$: the ID1 recording medium has a recordable capacity enough for the content purchased this time but not an enough remaining amount of money.
(4) $X1<Y$, $A<B$: the ID1 recording medium has neither a remaining amount of money nor a recordable capacity enough for the content purchased this time.

In the case of (1), a charging process as procedure F1 shown in FIG. 19 is executed. To be more specific, because the ID1 recording medium can pay the cost of the content purchased this time from the remaining prepaid amount and download the purchased content, a normal charging process takes place. Namely, in the charging information medium ID=ID1 registered with the customer database 70, the value of remaining amount X1 (yen) is updated to a value resulted from subtracting price Y (yen) from the remaining amount X 1 ($X1=X1-Y$).

Obviously, the content supplied to the terminal 1 is recorded to the ID1 recording medium.

In the case of (2), the remaining recordable capacity of the ID1 recording medium is not enough for the content purchased this time, namely the purchased content cannot be recorded to the ID1 recording medium. Therefore, in charging processing, procedure F2 requires the terminal 1 to load another recording medium 4. In response, the terminal 1 notifies the user that the loaded recording medium 4 has not enough recordable capacity and prompts, through the display section 28a or the audio output section 28b, the user to load the other recording medium 4.

In response, the user loads the other recording medium 4, namely the ID2 recording medium.

Then, the terminal 1 reads the prepaid information from the ID2 recording medium, checks the recordable remaining capacity, the terminal 1 sends the prepaid information and the recordable capacity to the server 3.

The server 3 takes the charging information corresponding to the medium ID=ID2 out of the customer database 70. If the ID2 recording medium has been loaded for the first time, the corresponding charging information is registered with the customer database 70.

Then, in procedure F3, the remaining prepaid amount of money X2 (yen) registered for the ID2 recording medium is linked with the remaining prepaid amount of money X1 of the above-mentioned ID1 recording medium (X1+X2). In addition, the recordable capacity A2 (minutes) of the ID2 recording medium is checked if it is enough for the content of B (minutes).

In this example, $X1 \geq Y$, so that $(X1+X2) \geq Y$ obviously. If the recordable capacity A2 of the ID2 recording medium is found enough for the data size B of the content, a charging process takes place as procedure F4. If the recordable capacity A2 is found not enough, the server 3 requires the terminal 1 (and the user) to load the other recording medium 4.

In procedure F4, the server 3 instructs the terminal 1 to record the content to be downloaded this time to the ID2 recording medium. Then, the server 3 updates the charging information registered for the ID2 recording medium such that the content charge is subtracted by reflecting the link processing of procedure F3. Namely, the server 3 first adds the remaining amount of money X1 of the ID1 recording medium to the remaining prepaid amount of money X2 in the charging information for the ID2 recording medium and then subtracts the content price Y from the result of the addition ($X2=X2+X1-Y$).

On the other hand, as a result of the linking of the remaining amounts of money, the charging information for the ID1 recording medium is taken out of registration; namely a registration deleting process is executed.

The registration deleting process as used in the present example does not mean the deletion of the charging information itself; it means that the ID1 recording medium is made unusable thereafter. Actually, the balance in the charging information is set to zero and the registration data are kept undeleted. For example, the ID1 recording medium is put in the state of charging information K5 shown in FIG. 7.

The prepaid information of the recording medium 4 is unrewritable. Therefore, it is possible for the user to load, erroneously or through malice, the recording medium 4 with its prepaid information deleted into the terminal 1 again for getting content distribution.

If this happens, the customer database 70 is searched for on the basis of the medium ID as described before. If no corresponding charging information is found, the recording medium 4 thus loaded is newly registered. This means that, if the charging information itself (including the medium ID) is deleted as a registration deleting process, the recording medium 4 with its remaining amount set to zero can be newly registered again. Namely, the user can reuse the recording medium of which prepaid amount of money has been used up, starting with a full amount of money. To prevent this problem from happening, the charging information of that recording medium must be kept undeleted with the balance set to zero. Namely, when any recording medium that has been deleted of registration is loaded in the terminal, the server 3 must determine that the prepaid amount of money of this recording medium has all been consumed. For this purpose, the balance in the charging information may only be set to zero in the registration deleting process, thereby preventing the recording medium of which prepaid amount of money has all been consumed from being reused as a prepaid recording medium.

For another process of deleting the registration, a data group as registration deleted IDs is arranged in the customer database 70, the charging information of a recording medium of which prepaid amount of money has all been consumed is deleted, and only its medium ID is put in this data group. This configuration allows the server 3 to find that a loaded recording medium 4 of which prepaid information has been deleted from registration is not for new use but deleted from registration and therefore invalid.

In procedure F4, the charging processing is executed on the ID2 recording medium as described above, the content is recording to the ID2 recording medium, and the ID1 recording medium is deleted from registration.

Consequently, the user can obtain content by means of the ID2 recording medium.

Subsequently, the ID1 recording medium can be used by the user for recording or reproduction of music for example but not as a prepaid medium.

In the case of (3), the ID1 recording medium has a remaining recordable capacity enough for the content purchased this time but an insufficient remaining amount of money. Namely, the ID1 recording medium alone cannot be used as a prepaid medium for purchasing the content this time.

Therefore, for procedure F5 in charging processing, the server 3 requires the terminal 1 to load the other recording medium 4. In response, the terminal 1 instructs, through the display section 28a or the audio output section 28b, the user to load the other recording medium 4.

In response, the user loads the another recording medium 4, namely the ID2 recording medium.

When the ID2 recording medium is loaded, the terminal 1 reads the prepaid information from the ID2 recording medium, determines a remaining recordable capacity, and sends these information to the server 3.

The server 3 takes the charging information corresponding to media ID=ID2 out of the customer database 70 (or newly registers the ID2 recording medium).

In procedure 6, the remaining prepaid amount X2 (yen) registered for the ID2 recording medium is linked with the remaining prepaid amount X1 of the ID1 recording medium (X1+X2). In addition, it is determined whether the recordable capacity A2 (minutes) of the ID2 recording medium is enough for the content of B (minutes).

In this case, X1+X2≧Y indicates that the charging is enabled for content purchase. If X1+X2<Y, then the remaining prepaid amount is still insufficient, so that the server 3 requires the terminal 1 (and the user) to load the another recording medium 4.

In the case of (3), the ID1 recording medium is enough in terms of recording capacity. On the other hand, as for the recordable remaining capacity A2 of the ID2 recording medium, there two cases; enough for the data size B of content (A2≧B) and not enough (A2<B).

If the recordable remaining capacity A2 of the ID2 recording medium is not enough (A2<B), the content must be recorded to the ID1 recording medium. The terminal 1 instructs, through the display section 28a or the audio output section 28b, the user to change the recording media.

Namely, in this case, the server 3 instructs the terminal 1 to download the content this time to the ID1 recording medium in procedure F9. Then, the server 3 updates the charging information registered for the ID1 recording medium by subtracting the content charge on the basis of the link process executed in procedure F6. Namely, the remaining amount X2 of the ID2 recording medium is added to the remaining prepaid amount X1 in the charging information for the ID1 recording medium and content charge Y is subtracted from the result of the addition (X1=X1+X2−Y).

On the other hand, in accordance with the result of the remaining amounts linking process, the server 3 deletes the registration of the charging information for the ID2 recording medium. Thus, the remaining amounts of money of the two recording media can be brought together to the ID1 recording medium.

Consequently, the user can obtain the content by use of the ID1 recording medium.

Subsequently, the ID2 recording medium can be used by the user for recording or reproduction of music for example but not as a prepaid medium.

If both the ID1 recording medium and the ID2 recording medium have enough remaining recordable capacities, the user is asked in procedure F7 which recording medium to be used. To be more specific, the server 3 requires the terminal 1 for medium selection and the terminal 1 requires the user to select a recording medium to which content is to be recorded. The terminal 1 sends the result of the selection made by the user to the server 3.

In procedure F8, the server 3 instructs the terminal 1 to record the content to be downloaded this time to the selected recording medium. Then, the server 3 updates the charging information registered for the selected medium such that the content charge is subtracted by reflecting the link processing executed in procedure F6. As for the unselected recording medium, its charging information is deleted from registration.

Namely, if the ID1 recording medium has been selected, the value of remaining amount X1 is updated to the value of X1=X1+X2−Y in the charging information for the ID1 recording medium, deleting the registration of the charging information for the ID2 recording medium.

On the other hand, if the ID2 recording medium has been selected, the value of remaining amount X2 is updated to the value of X2=X1+X2−Y in the charging information for the ID2 recording medium, deleting the registration of the charging information for the ID1 recording medium.

Consequently, the user can obtain content by use of the selected recording medium. Subsequently, the unselected recording medium can be used by the user for recording or reproduction of music for example but not as a prepaid medium.

In the case of (4), the ID1 recording medium is insufficient in both remaining recordable capacity and remaining amount of money for the purchase of content this time. Namely, the ID1 recording medium alone cannot be use as a prepaid recording medium and cannot record the content requested by the user.

Therefore, in charging processing, the server 3 requires the terminal 1 to load the other recording medium 4 in procedure F10. The terminal 1 instructs, through the display section 28a or the audio output section 28b, the user to load the other recording medium 4 into the terminal 1.

In response, the user loads the other recording medium 4, namely the ID2 recording medium.

The terminal 1 reads the prepaid information from the ID2 recording medium and checks the remaining recordable capacity and sends these information to the server 3.

The server 3 takes the charging information for the medium ID=ID2 out of the customer database 70 or newly registers the ID2 recording medium.

In procedure F11, prepaid remaining of amount X2 (yen) registered for the ID2 recording medium is linked with remaining prepaid amount X1 of the ID1 recording medium (X1+X2). Further, the server 3 checks to see if recordable capacity A2 (minutes) of the ID2 recording medium is enough for recording the content of B (minutes).

In this case, X1+X2≧Y permits the charging for the purchased content. If X1+X2<Y, it indicates the prepaid remaining amount of money is still insufficient, so that the server 3 requires the terminal 1 to load the other recording medium 4.

If the recording capacity A2 of the ID2 recording medium is not enough for the data size B of content, the server 3 also requires the terminal 1 (and the user) to load the other recording medium 4.

If X1+X2≧Y and the recordable capacity of the ID2 recording medium is enough, a charging processing is executed in procedure F12.

Namely, the server 3 instructs the terminal 1 to record the content to be downloaded this time to the ID2 recording medium. Then, the server 3 updates the charging information registered for the ID2 recording medium such that the content charge is subtracted by reflecting the result of the link process executed in procedure F11. To be more specific, the remaining amount X1 of the ID1 recording medium is added to the remaining prepaid amount X2 in the charging information of the ID1 recording medium, from which content charge Y is subtracted (X2=X2+X1−Y).

On the other hand, in accordance with the result of the remaining amounts linking process, the charging information of the ID1 recording medium is deleted from registration.

Consequently, the user can obtain the desired content by use of the ID2 recording medium. Subsequently, the ID1 recording medium can be used by the user for recording or reproduction of music for example but not as a prepaid medium.

The charging processing is executed as described above, so that, if one recording medium is insufficient in the remaining amount of money, the insufficiency can be covered by another prepaid recording medium for purchasing content. This novel arrangement enhances user convenience and allows to reuse those prepaid recording media which have only fractional remaining amount insufficient for purchasing content.

If the remaining amount has reached zero as a result of the charging processing in procedure F1, it indicates the same state in which the charging information is deleted from registration described above. If a data group of registration deleted IDs is to be registered, the medium ID of that charging information may only be put in this data group.

It will be apparent to those skilled in the art that the present invention is not restricted to the above-mentioned embodiment. For example, the terminal 1 and the server 3 can be configured in various other manners.

It will be also apparent to those skilled in the art that the processes to be executed by the terminal 1 and the server 3 shown in FIGS. 15 through 19 may be totally executed between the terminal 1 and the server 3 to achieve the above-mentioned objectives; namely the above-mentioned processes may be executed by the terminal 1 and the server 3 not in a fixed relationship between the processes and these members of the embodiment.

As described and according to the invention, prepaid information is stored in a recording medium to which distributed content is to be recorded. When content has actually been distributed, the charge of the distributed content is settled by updating, on the server side, the charging information registered with the server in accordance with the prepaid information read from the recording medium.

The novel constitution significantly enhances user convenience because the user need not input the number of his credit card or the number of his separately prepared dedicated prepaid card. This means that users who do not have credit cards or prepaid cards can also receive content distribution services.

In addition, because the novel constipation does not require a card number input operation, the operation to be executed for content purchase is simplified, thereby allowing users not familiar with personal computers or other electronic devices to purchase content with ease.

Consequently, the novel constitution does not present the security problem that takes place in a credit card number input operation.

Further, when content is purchased from a dedicated terminal device installed at a store and, even if a user can settle the charge of the downloaded content by cash, he can obtain the content only by loading a recording medium according to the invention, thereby facilitating a content purchase operation and allowing users having no cash carried with him.

The settlement on the basis of prepaid information is executed in the form of updating the charging information registered with the server side in correspondence with the prepaid information. Consequently, the prepaid information of the recording medium need not be updated and therefore reduces the settlement processing load on the terminal side. This also prevents the recording medium from being abused by tampering its prepaid information.

Moreover, the prepaid information is stored in the recording medium in an unrewritable manner, thereby further preventing the prepaid recording medium from abuse.

When the charging processing means of the server executes a charging process on the first charging information registered with the charging information registration means in correspondence with the first prepaid information recorded on the first recording medium loaded in the terminal, if the amount of money is not enough for purchasing content, then the charging processing means requires the second prepaid information recorded on the second recording medium and links the second charging information registered with the charging information registration means in correspondence with the second prepaid information with the first charging information to execute a charging processing. Consequently, if the remaining prepaid amount of money is running short on one recording medium owned by the user for purchasing content, the user can use another recording medium to add together the remaining prepaid amounts of money of both prepaid recording media to settle the charge of the purchased content. Namely, if one prepaid recording medium has only a fractional balance which is not enough for purchasing content, it can be added to the remaining prepaid amount of another prepaid recording medium, thereby allowing the user to make the most of his prepaid recording media.

If the charging information corresponding to the prepaid information supplied from the terminal has not yet been registered with the charging information registration means of the server, the charging information corresponding this prepaid information is newly registered with the charging information registration means. Consequently, the charging information is registered for every recording medium to be newly used by the user, thereby systematically allowing the efficient management of additional charging information.

In addition, the charging processing means deletes the registration of the charging information of which prepaid amount of money has all been consumed, thereby invalidating the prepaid capability of the recording medium on which the prepaid information corresponding to this charging information is recorded. Consequently, any recording medium with its prepaid amount of money fully used is no more available as a prepaid recording medium, thereby realizing proper accounting. Obviously, the user can still use such an invalidated recording medium as a simple recording medium having no prepaid capability. Consequently, unlike conventional prepaid cards, the invalidated prepaid recording media according to the invention need not be discarded as a waste, which is an advantage in terms of saving resources.

The prepaid information contains both prepaid amount of money information and ID information unique to each prepaid recording medium according to the invention, thereby allowing the appropriate management of the amount of money and individual prepaid recording media to provide proper charging processing.

Further, the prepaid information contains destination identifying information for identifying a server. Therefore, the terminal communicates with the server on the basis of this information, thereby making it unnecessary for the user to search for a server from which to download content, which further facilitates the content purchase operation to be executed by the user.

While the preferred embodiments of the present invention have been described using specific terms, such description is for illustrative purposes only, and it is to be understood that changes and variations may be made without departing from the spirit or scope of the appended claims.

What is claimed is:

1. An information distribution system having a terminal apparatus and an information center, in which a recording medium having recorded thereon unrewritable prepaid information is loadable in the terminal apparatus so as to enable content data to be transmitted to the recording medium from the information center via a predetermined communication line, said terminal apparatus comprising:
   first receiving means for receiving said content data transmitted from said information center;
   recording and reproducing means for recording said content data received by said first receiving means onto said recording medium loaded by a purchaser in said terminal apparatus and reproducing an identifier unique to said recording medium and said unrewritable prepaid information, wherein said unrewritable prepaid information includes a prepaid amount of money and a prepaid service ID representative of an address of the information center;
   first transmitting means for transmitting said reproduced identifier unique to said recording medium and said reproduced unrewritable prepaid information to said information center;
   said information center comprising:
   first storage means for storing a plurality of content data;
   second transmitting means for transmitting predetermined content data from said first storage means to said terminal apparatus;
   second receiving means for receiving said identifier unique to said recording medium and said unrewritable prepaid information transmitted from said terminal apparatus;
   second storage means for storing a usable remaining amount of money relative to said unrewritable prepaid information in accordance with said identifier unique to said recording medium and said unrewritable prepaid information received by said second receiving means;
   charging processing means for updating, when said predetermined content data are transmitted from said first storage means to said terminal apparatus, said usable remaining amount of money stored in said second storage means for a charge of said predetermined content data transmitted from said first storage means to said terminal apparatus,
   wherein the prepaid amount of money included in said unrewritable prepaid information on the recording medium is not updated when said predetermined content data is transmitted from the first storage means to said terminal apparatus;
   first comparing means for comparing said usable remaining amount of money stored in said second storage means with a price of content data to be transmitted to said terminal apparatus;
   wherein, when said usable remaining amount of money is found by said first comparing means to be less than said price of said content data to be transmitted to said terminal apparatus, a control signal is transmitted from said information center to said terminal apparatus to instruct said terminal apparatus to prompt for a loading of a second recording medium recording beforehand an identifier unique thereto and prepaid information into said terminal apparatus;
   adding means for adding, when said second recording medium has been loaded in response to the prompt for the loading of said second recording medium, a usable remaining amount of money in said second recording medium to said usable remaining amount of money in the previously loaded recording medium;
   wherein said recording medium also records information about a remaining recordable capacity thereof, said information is reproduced by said recording and reproducing means, and said reproduced information is transmitted by said first transmitting means to said information center;
   wherein when after loading of said second recording medium into said terminal apparatus in response to the prompt for the loading of said second recording medium, a result of an addition by said adding means is found in excess of said price of said content data to be transmitted, said identifier unique to said recording medium and said prepaid information stored in said second storage means are edited based on said information about the remaining recordable capacity of said previously loaded recording medium and said information about the remaining recordable capacity of said second recording medium; and
   wherein, when said usable remaining amount of money is consumed, the identifier unique to said recording medium stored in the second storage medium is moved to a registration deleted group in the second storage medium to indicate the recording medium has been deleted from registration and is invalid.

2. An information center connected to a terminal apparatus via a predetermined communication line for distributing content data, the information center comprising:
   first storage means for storing a plurality of content data;
   transmitting means for transmitting predetermined content data from said first storage means to said terminal apparatus;
   receiving means for receiving from said terminal apparatus an identifier unique to a recording medium and unrewritable prepaid information stored in the recording medium which is loaded in said terminal apparatus, wherein said unrewritable prepaid information includes a prepaid amount of money and a prepaid service ID representative of an address of the information center;

second storage means for storing a usable remaining amount of money in accordance with said identifier unique to said recording medium and said unrewritable prepaid information received by said receiving means;

charging processing means for updating, when said predetermined content data are transmitted from said first storage means to said terminal apparatus, said usable remaining amount of money stored in said second storage means for a charge of said predetermined content data transmitted from said first storage means to said terminal apparatus, wherein the prepaid amount of money included in said unrewritable prepaid information on the recording medium is not updated when said predetermined content data is transmitted from said first storage means to said terminal apparatus;

first comparing means for comparing said usable remaining amount of money stored in said second storage means with a price of content data to be transmitted to said terminal apparatus;

wherein, when said usable remaining amount of money is found by said first comparing means to be less than said price of said content data to be transmitted, a control signal is transmitted from said information center to said terminal apparatus to instruct said terminal apparatus to prompt for a loading of a second recording medium, having recorded thereon an identifier unique thereto and prepaid information, into said terminal apparatus;

adding means for adding, when said second recording medium has been loaded in response to the prompt for the loading of said second recording medium, a usable remaining amount of money in said second recording medium to said usable remaining amount of money in the previously loaded recording medium;

wherein, when after loading of said second recording medium into said terminal apparatus in response to the prompt of the loading of said second recording medium, a result of an addition by said adding means is found to be in excess of said p rice of said content data to be transmitted, said identifier unique to said recording medium and said prepaid information stored in said second storage means are edited based on said information about the remaining recordable capacity of said previously loaded recording medium and said information about the remaining recordable capacity of said second recording medium; and wherein, when said usable remaining amount of money is consumed, the identifier unique to said recording medium stored in the second storage medium is moved to a registration deleted group in the second storage medium to indicate the recording medium has been deleted from registration and is invalid.

3. An information distribution method for distributing content data from an information center to a recording medium loaded in a terminal apparatus, said information center and said terminal apparatus being interconnected via a predetermined communication line, the method comprising the steps of:

receiving an identifier unique to said recording medium and unrewritable prepaid information recorded on said recording medium loaded by a purchaser in said terminal apparatus and transmitted from said terminal apparatus, wherein said unrewritable prepaid information includes a prepaid amount of money and a prepaid service ID representative of an address of the information center;

storing in a memory a usable remaining amount of money relative to said unrewritable prepaid information in accordance with said received identifier unique to said recording medium and said received unrewritable prepaid information;

comparing said usable remaining amount of money stored in said memory with a charge of content data to be distributed from said information center to said terminal apparatus; wherein when said usable remaining amount of money is found to be smaller than said price of said content data to be transmitted, a control signal is transmitted from said information center to said terminal apparatus to instruct said terminal apparatus to prompt for a loading of a second recording medium having recorded thereon an identifier unique to said second recording medium and prepaid information;

adding, when said second recording medium has been loaded in response to the prompt for the loading of said second recording medium, a usable remaining amount of money in said second recording medium to said usable remaining amount of money in the previously loaded recording medium;

permitting, when said usable remaining amount of money stored in said memory is greater than said charge of said content data to be distributed from said information center to said recording medium loaded in said terminal apparatus, the transmission of said content data from said information center to said recording medium loaded in said terminal apparatus;

updating, by said charge of said content data, said usable remaining amount of money stored in the memory when said content data are transmitted from said information center to said recording medium loaded in said terminal apparatus, wherein the prepaid amount of money included in said unrewritable prepaid information on said recording medium is not updated when said predetermined content data is transmitted from said information center to said recording medium loaded in said terminal apparatus; and wherein, when said usable remaining amount of money is consumed, the identifier unique to said recording medium stored in the memory is moved to a registration deleted group in the memory to indicate the recording medium has been deleted from registration and is invalid.

* * * * *

UNITED STATES PATENT AND TRADEMARK OFFICE
CERTIFICATE OF CORRECTION

PATENT NO. : 7,295,994 B2 Page 1 of 1
APPLICATION NO. : 09/885480
DATED : November 13, 2007
INVENTOR(S) : Tadao Yoshida, Chisato Kitsukawa and Yoshihiko Hitotsui It is certified that error appears in the above-identified patent and that said Letters Patent is hereby corrected as shown below:

In Column 31, Line 40, "p rice" should read --price--.

Signed and Sealed this

Fourth Day of November, 2008

JON W. DUDAS
*Director of the United States Patent and Trademark Office*